United States Patent
Nejah et al.

(10) Patent No.: US 11,639,749 B1
(45) Date of Patent: May 2, 2023

(54) GEAR SET

(71) Applicants: Allen Nejah, San Jose, CA (US); Sagar Bhatia, San Jose, CA (US)

(72) Inventors: Allen Nejah, San Jose, CA (US); Sagar Bhatia, San Jose, CA (US)

(73) Assignee: SunMan Engineering, Inc., San Jose, CA (US)

( * ) Notice: Subject to any disclaimer, the term of this patent is extended or adjusted under 35 U.S.C. 154(b) by 359 days.

(21) Appl. No.: 16/880,923

(22) Filed: May 21, 2020

Related U.S. Application Data

(60) Provisional application No. 62/851,042, filed on May 21, 2019.

(51) Int. Cl.
*F16H 55/12* (2006.01)
*F16H 55/30* (2006.01)
*F16H 9/24* (2006.01)

(52) U.S. Cl.
CPC .............. *F16H 55/12* (2013.01); *F16H 9/24* (2013.01); *F16H 55/30* (2013.01)

(58) Field of Classification Search
CPC ... F16H 9/10; F16H 9/12; F16H 9/125; F16H 55/54; B62M 9/08
USPC ..................................................... 474/47, 49
See application file for complete search history.

(56) References Cited

U.S. PATENT DOCUMENTS

| | | | | |
|---|---|---|---|---|
| 3,798,989 A * | 3/1974 | Hunt | F16H 55/30 | 474/49 |
| 4,030,373 A * | 6/1977 | Leonard | B62M 9/08 | 474/49 |
| 4,342,559 A * | 8/1982 | Williams | F16H 9/10 | 474/49 |
| 4,457,739 A * | 7/1984 | Iseman | F16H 55/54 | 474/69 |
| 4,493,678 A * | 1/1985 | Husted | B62M 9/08 | 474/57 |
| 4,626,228 A * | 12/1986 | Kooijman | B62M 9/08 | 474/49 |
| 4,634,406 A * | 1/1987 | Hufschmid | B62M 9/08 | 474/49 |
| 4,642,070 A * | 2/1987 | Walker | B62M 9/08 | 474/57 |
| 4,645,475 A * | 2/1987 | Husted | B62M 9/08 | 474/49 |
| 4,696,662 A * | 9/1987 | Gummeringer | B62M 9/08 | 474/49 |
| 4,717,369 A * | 1/1988 | Husted | B62M 9/08 | 474/49 |
| 4,740,190 A * | 4/1988 | Pike | B62M 9/08 | 474/49 |
| 4,772,250 A * | 9/1988 | Kovar | B62M 9/08 | 474/49 |

(Continued)

*Primary Examiner* — Henry Y Liu

(74) *Attorney, Agent, or Firm* — Law Office of Craig Bohn; Craig E. Bohn

(57) ABSTRACT

A gear system based on variably expandable gears, where input from either or both an operator or a computer processor may induce selective radial expansion and contraction of at least one gear in a gear set. The computer processor may be programmed to establish and maintain a desired gear ratio, regardless of the various variable forces which may be encountered, permitting gear setting and adjustment to control a desired parameter, such as speed, revolutions-per-minute, and watts with minimal effort by the operator.

3 Claims, 25 Drawing Sheets

(56) References Cited

U.S. PATENT DOCUMENTS

| | | | | |
|---|---|---|---|---|
| 4,810,235 A * | 3/1989 | Husted | B62M 9/08 | 474/49 |
| 4,850,939 A * | 7/1989 | Chilcote | G01P 3/489 | 474/49 |
| 4,946,426 A * | 8/1990 | Leonard | F16H 9/10 | 474/49 |
| 4,952,196 A * | 8/1990 | Chilcote | B62M 9/08 | 474/70 |
| 4,973,289 A * | 11/1990 | Leonard | B62M 9/08 | 474/49 |
| 5,006,094 A * | 4/1991 | Leonard | B62M 9/08 | 474/49 |
| 5,011,458 A * | 4/1991 | Kumm | F16H 37/0846 | 477/41 |
| 5,104,357 A * | 4/1992 | Leonard | F16H 55/54 | 474/49 |
| 5,476,422 A * | 12/1995 | Schendel | B62M 9/08 | 474/49 |
| 5,984,814 A * | 11/1999 | Davenport | B62M 9/08 | 474/57 |
| 6,183,385 B1 * | 2/2001 | Bakulich, Jr. | F16H 55/54 | 474/49 |
| 6,267,699 B1 * | 7/2001 | Gruich | B62M 9/14 | 474/49 |
| 6,332,852 B1 * | 12/2001 | Allard | B62M 9/08 | 474/49 |
| 6,432,009 B1 * | 8/2002 | Hansen | B62M 9/08 | 474/57 |
| 6,749,531 B2 * | 6/2004 | Kang | B62M 9/08 | 474/47 |
| 7,156,764 B2 * | 1/2007 | Mercat | B62M 25/045 | 474/47 |
| 7,955,203 B2 * | 6/2011 | Siman-Tov | F16G 13/02 | 474/155 |
| 9,765,860 B2 * | 9/2017 | Tange | F16H 9/24 | |
| 9,816,598 B2 * | 11/2017 | Wong | F16H 9/06 | |
| 10,167,055 B2 * | 1/2019 | Magee | B62M 9/08 | |
| 2002/0084618 A1 * | 7/2002 | Lerman | B62M 1/36 | 280/281.1 |
| 2004/0072640 A1 * | 4/2004 | Kang | B62M 9/08 | 474/47 |
| 2004/0097307 A1 * | 5/2004 | Murray | B62M 9/08 | 474/69 |
| 2005/0192136 A1 * | 9/2005 | Allard | F16H 55/54 | 474/47 |
| 2005/0233846 A1 * | 10/2005 | Green | F16H 55/54 | 474/47 |
| 2005/0288137 A1 * | 12/2005 | Vargas | F16H 55/54 | 474/49 |
| 2011/0045928 A1 * | 2/2011 | Wong | F16H 55/54 | 474/47 |
| 2011/0059821 A1 * | 3/2011 | Lee | F16H 55/56 | 474/8 |
| 2012/0238384 A1 * | 9/2012 | Lee | F16H 9/10 | 474/25 |
| 2014/0248981 A1 * | 9/2014 | Lee | F16H 9/10 | 474/8 |
| 2015/0251725 A1 * | 9/2015 | Rockwood | F16H 9/24 | 474/56 |
| 2016/0039496 A1 * | 2/2016 | Hancock | G01S 19/25 | 701/60 |
| 2016/0114858 A1 * | 4/2016 | Magee | B62M 9/08 | 474/49 |
| 2016/0169363 A1 * | 6/2016 | Wong | F16H 9/06 | 474/69 |
| 2017/0167590 A1 * | 6/2017 | Braedt | B62M 9/12 | |
| 2017/0283006 A1 * | 10/2017 | Schuster | F16H 55/54 | |

* cited by examiner

GEAR SET

CROSS-REFERENCE TO RELATED APPLICATIONS

This application claims the benefit of U.S. Patent Application No. 62/851,042, filed on May 21, 2019, by the present inventors, entitled "Gear Set," which is hereby incorporated by reference in their entirety for all allowable purposes, including the incorporation and preservation of any and all rights to patentable subject matter of the inventor, such as features, elements, processes and process steps, and improvements that may supplement or relate to the subject matter described herein.

STATEMENT REGARDING FEDERALLY SPONSORED RESEARCH OR DEVELOPMENT

Not Applicable

BACKGROUND OF THE INVENTION

This invention relates generally to endless belt power transmission systems, and more specifically to a gear set with a variably adjusting radius of a gear interface to the endless belt.

The following patents describe various adjustable diameter mechanisms, the state of the art, and problems and challenges, to which they offer solutions, which address only part of the problem and challenges addressed by the present design. U.S. Pat. No. 4,493,678, by Royce H. Husted, filed on Jun. 11, 1982, describes a design entitled Expandable Sprocket. U.S. Pat. No. 4,740,190, by Joseph A. Pike, filed on Jan. 29, 1987, describes a design entitled Variable Ratio Bicycle Chain Drive. U.S. Pat. No. 4,850,939, by Keith C. Chilcote and Robert J. Mahlowski, filed on Oct. 21, 1987, describes a design entitled Variable Diameter Sprocket Assembly. U.S. Pat. No. 4,952,196, by Keith C. Chilcote and Robert J. Mahlowski, filed on Oct. 21, 1987, describes a design also entitled Variable Diameter Sprocket Assembly. U.S. Pat. No. 5,984,814, by Bruce Davenport, filed on Sep. 4, 1997, describes a design entitled Variable Ratio Chain Drive Transmission. Each of these patents is hereby incorporated by reference in its entirety to provide examples of the state of the art and background of the current invention, challenges perceived by those in the field of art, objectives in creating a more desirable design, and to provide examples of standard terms and nomenclature employed in the field of art.

It would be a valuable addition to the field of art, among other things, to provide a gear set embodying either or both a drive or a driven surface where the diameter, and therefore the circumference, may be controllably expanded or reduced in order to modify the gearing ratio of the gear set. It would be a valuable addition to the field to provide a manually controlled variable gear set, where sections of a gear surface may move outwardly or inwardly, controlled by a spring and lock mechanism that permits the outward movement of a section while it is not engaged with the drive chain, and limits such outward movement of the section while it is engaged, so as to not bind the operation of the gear and chain set. It would be a valuable addition to the field to provide an electronically controlled variable gear set, where sections of a gear surface may move outwardly or inwardly, controlled by a motor that creates the outward movement of a section while it is not engaged with the drive chain, and limits such outward movement of the section while it is engaged, so as to not bind the operation of the gear and chain set. It would be a valuable addition to the field to integrate the controls of the variable surface with a computer processor, connected to sensors for such factors as directional speed, rotational speed, and torque, in order to determine the gear ratios most desirable to the operator, in such ways as pedaling revolutions-per-minutes, applied torque, or watts, and adjust the gear set to achieve the desired operational conditions.

SUMMARY OF THE INVENTION

The principle exemplary embodiment is reduced to practice in a bicycle, and encompasses the bicycle chain and the gear set, which may comprise both the drive and driven gears. In the exemplary embodiment, the radius of the drive sprocket is configured to expand or reduce in order to change the gearing ratio, in accordance with the teachings of this disclosure. One exemplary embodiment provides for a mechanical radius adjustment, while an alternate exemplary embodiment provides for an electronic radius adjustment.

The known shortcomings of the traditional bicycle transmission system have spawned efforts to design and develop alternative design approaches incorporating adaptable gear ratios using adjustable gear diameters, through which the drive chain operates. This development is not limited to use in the exemplary embodiments, but may be useful in other vehicles and equipment, powered by human effort or other power sources.

The transmission system described subsequently involves the respective radii of the forward and rear gears to be variable, during which the pedaling by the rider can continue uninterrupted during these transitions. This means that the radial path of the drive chain can expand and contract as the gear itself expands and contracts as needed by the rider. With this method, a traditional derailleur is not utilized, and therefore the jarring effects of a derailleur nudging the drive chain from one radial gear to another, is no longer present. This design enhancement over the traditional derailleur approach enables benefits exceeding not only rider comfort, but rider safety as well, due to the design's low maintenance and malfunction rate.

The application of this technology in the bicycle will be described in detail hereafter for illustrative intents only, however, this design enhancement to traditional derailleur approach is applicable to any mechanically-driven transmission system, such as but not limited to cars, trucks, motorcycles, ATVs, industrial machines, forklifts, and the like.

This technology provides a method of mechanical energy transmission driven by a chain, shaft, leadscrew, or the like, which the driving gear has adaptable and highly granular diameters, during operation by the rider.

This technology also provides an infinitely variable sprocket device for use in bicycle transmissions and the like wherein the variable ratios obtainable with the device are provided by increasing or decreasing the effective diameter of the drive sprocket.

It is a further objective of this invention to provide a bicycle transmission or the like wherein an infinitely variable speed change is available through selective braking of individual sprocket locating plates such that speed ratios can be altered while continually pedaling forwardly or continuing to drive the mechanism in a forward direction.

DESCRIPTION OF THE EXEMPLARY EMBODIMENTS

To assist in understanding of this description, a few definitions are provided. One of ordinary skill in the field of art may appreciate that an "endless belt" may include a band, belt, cord, rope, and chain, as well as other structures with a continual surface, typically where the two ends may be securely joined. Applying tension along the length of the structure may result in motion of the structure along its endless length, and with that motion may transfer linear motion through tensioned contact with an adjacent structure, such as a gear.

One of ordinary skill in the field of art may appreciate that a "gear" may refer to both an individual wheel structure, typically having a toothed surface pointing outwardly along the outer circumferential surface, or a specific configuration of a transmission that gives a specific ratio of power input to torque output, created by a particularly sized set of wheels and their connection, which may be an endless belt.

One of ordinary skill in the field of art may appreciate that "rotary motion" may be created by the transfer of power through an endless belt to a wheel turning about an axis.

One of ordinary skill in the field of art may appreciate that a "crank" is a well-known device which has a "crankshaft" and rotates around a central axis through the crankshaft. A crank also has a "crank arm" extending from the crankshaft with a crank "pin" mounted to the crank arm at a selected radius, known as the crank throw, from the central axis so that the crank pin moves along a circular path about the central axis. However, it is also well known that this is an elementary device, and there are a broad variety of alternative structures which can form an elementary crank. Additionally, the component parts are not limited to structures typically identified by this structural terminology. For example, the "crank arm" is not confined to an arm, but can, for example, be a wheel with a crank pin extending from it. Consequently, the terminology used to refer to the crank is used generically to refer to the structures which function as the elementary components of a crank. The term crankshaft refers to the structure which rotatably mounts the crank and the term crank pin refers to the structure to which a body, such as a connecting rod, is rotatably mounted so that it can move in alternating motion as the crank moves in continuous, rotary motion. An example of the structural variety is a "pedal," which may refer to a crank, or may refer to a structural equivalent of a crank and a crank arm. In an exemplary embodiment, a pair of pedals may be attached to each other across a crankshaft.

Figure 4:
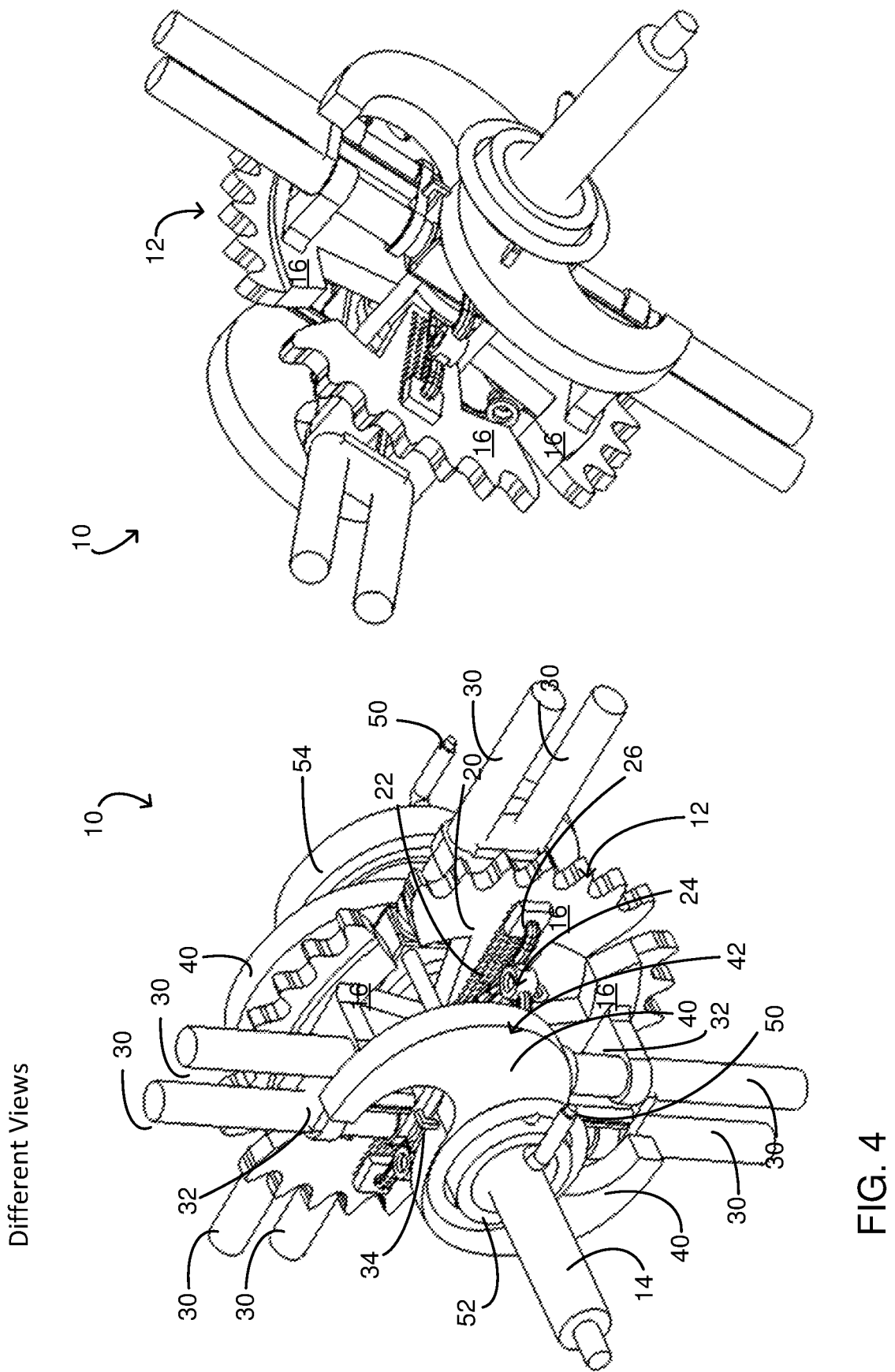
FIGS. 4 through 19 are pages of a presentation of an exemplary manual alternate exemplary gear, gear set, and components according to the present invention.
Figure 5:
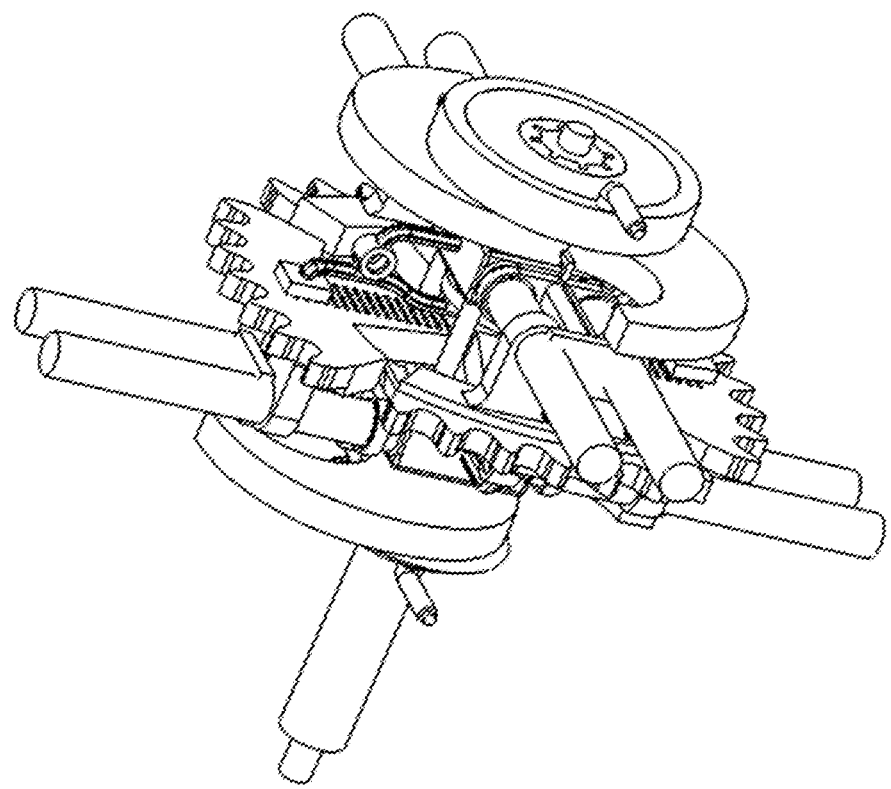
Figure 5:
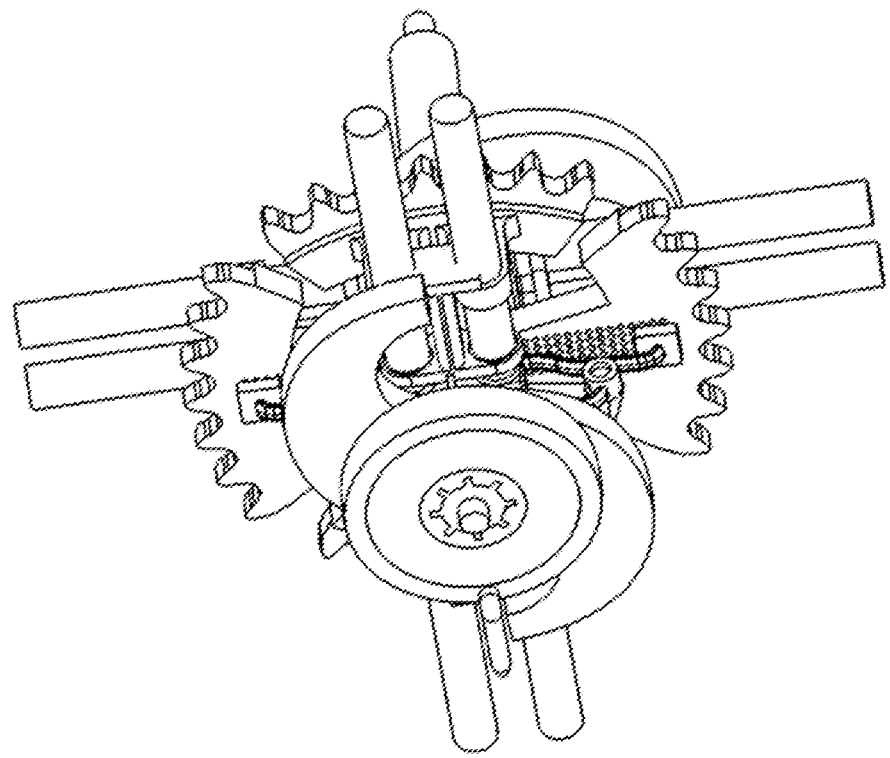
Figure 6:
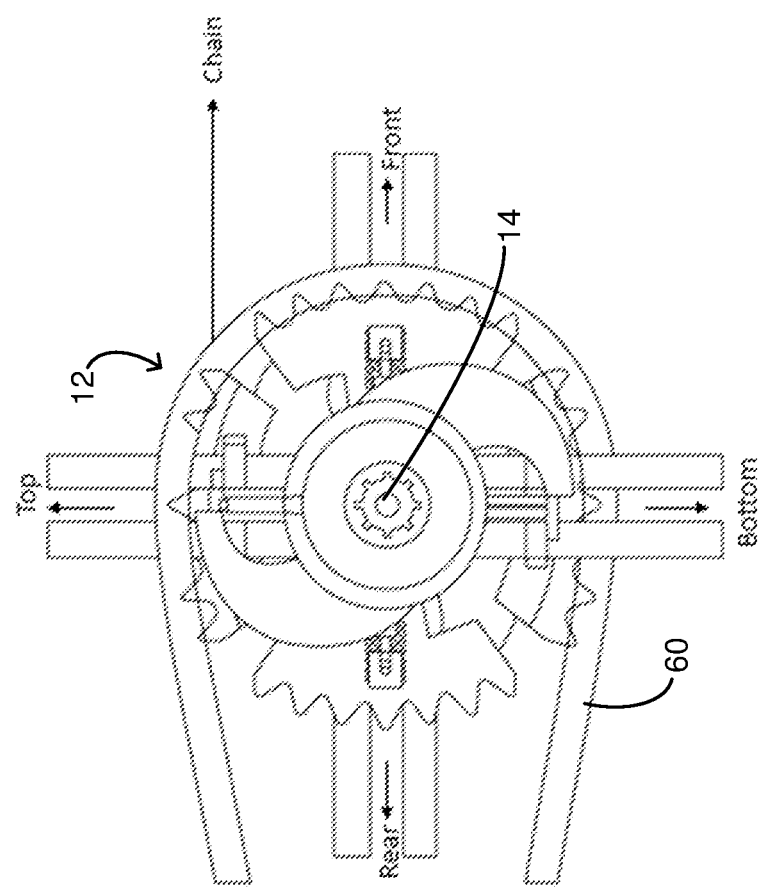
Figure 7:
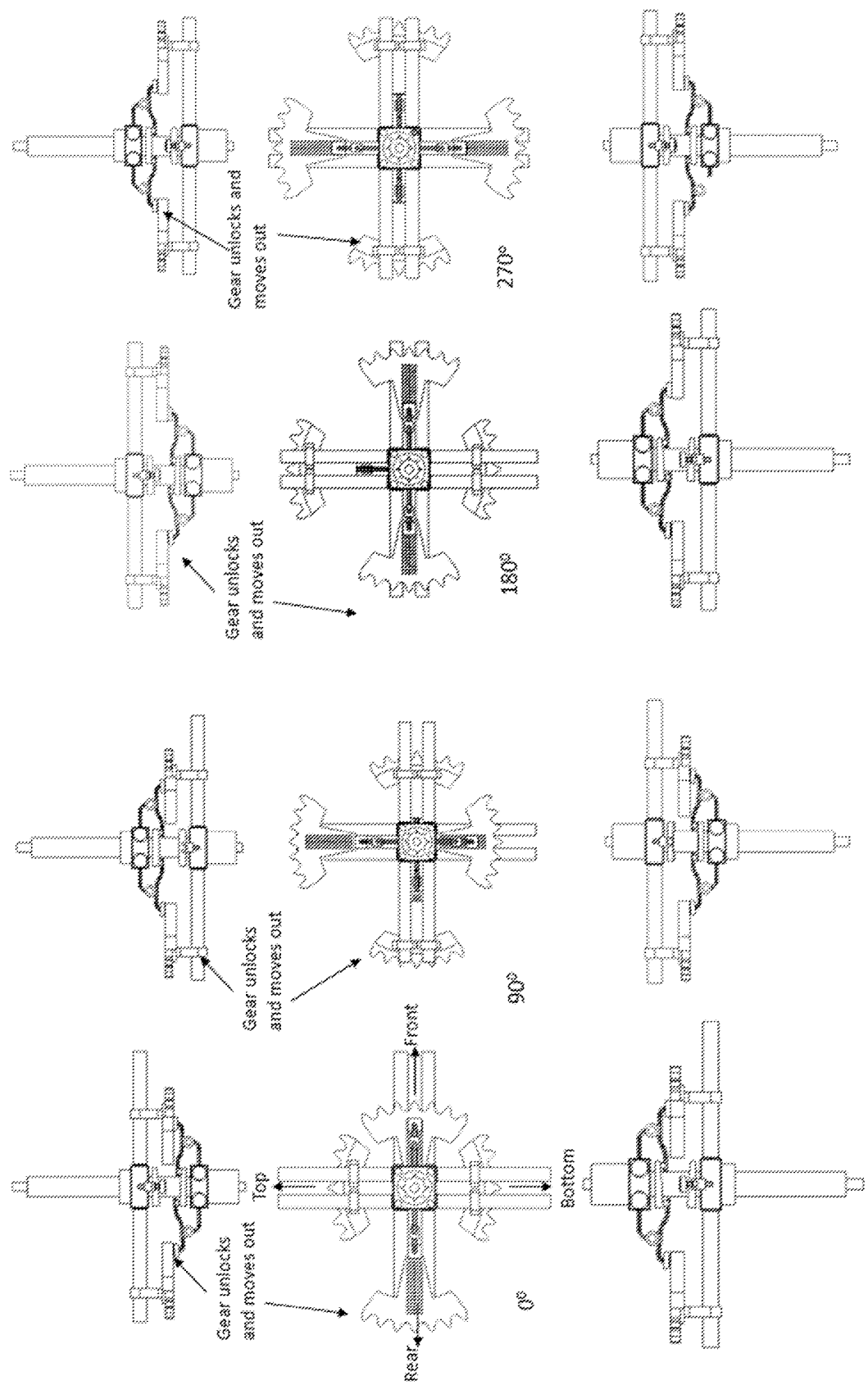

In the exemplary bicycle embodiment, the gear set 10 shown in FIG. 4 may be considered the front gear set, which has a main sprocket 12. As such, a "rear quadrant" of the main sprocket exists that is primarily positioned toward the rear wheel or gear set. The section of the sprocket of the front gear set that is not engaged with the endless belt or chain may be referred to as the "rear quadrant." In a single rotation of the sprocket, each section of the sprocket may be the "rear quadrant" for a single period of the rotation that quadrant is closer to the driven sprocket than the other quadrants. For convention in this disclosure, a section of the sprocket may be seen as the "rear quadrant," but then move from this rear position to the "top quadrant," the "front quadrant," and then the "bottom quadrant," in succession. In an alternate exemplary embodiment, where the inventive gear set is applied to the rear sprocket, the released quadrant would be positioned toward the front of the bicycle or front sprocket.

Techniques for adjusting gear ratios using hydraulics or other means, and methods of using pressure sensors, are disclosed herein. In one embodiment, a variably expandable gear that expands or contracts the gear radius automatically as needed, mechanically or by any other means. A chain then fits over the variably expandable gear in order to turn a corresponding wheel at varying gear ratios. As the terrain slope increases, resulting in the need for a smaller gear diameter, the variably expandable gear automatically contracts into a gear which is smaller than its initial diameter. As the terrain slope decreases, resulting in the need for a larger gear diameter, the variably expandable gear automatically expands into a gear which is larger than its initial diameter. This expansion or contraction may take place by means of hydraulic power, mechanically, or by any other means.

In one embodiment, inertial forces from the motion of the vehicle onto the gear may be stored in a hydraulic energy storage system.

In one embodiment, pressure sensors are used to detect the pedal rate of the rider, and force upon the gear. Sensors may be placed on the gear, on the chain, on the frame of the vehicle, and on the pedals themselves. The sensors may consist of accelerometers, gyroscopic sensors, altimeters, vibration sensors, jerk sensors, radial displacement sensors, hydraulic pressure sensors, and the like.

Figure 3:
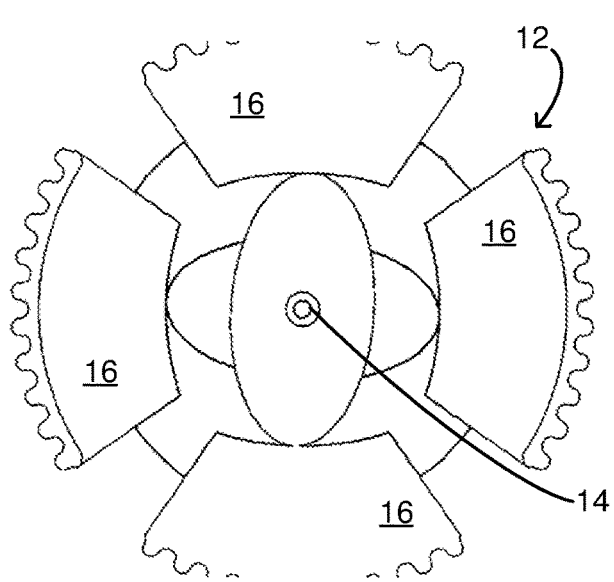
FIG. 3 is a schematic illustration of the gear in FIG. 1 in a fully expanded position.

In one embodiment, a button accessible to the rider can be depressed in such case that the rider needs or prefers a specific set pedal force, actively adaptable to the terrain slope. Likewise, a button accessible to the rider can be depressed in such case that the rider needs or prefers a specific set pedal rate, actively adaptable to the terrain slope. The variably expandable gear will continuously optimize its diameter (FIG. 3) to best maintain these two parameters.

In one embodiment, the pressure sensors are used in conjunction with a subsystem—computerized, mechanical, and the like—to respond to the rider's indication of his or her desired force or pedal rate, as indicated by the depression of a button located near the rider, to adjust and optimize the variably expandable gear (FIG. 1) accordingly as the terrain slope and road conditions change, during which the rider is in motion. The pressure sensors continuously feed force and pedal rate information from the wheels into the computerized or mechanical system, which can respond through changing the variably expandable gear (FIG. 1) diameter, as needed to optimize the rider's set riding preference.

Figure 1:
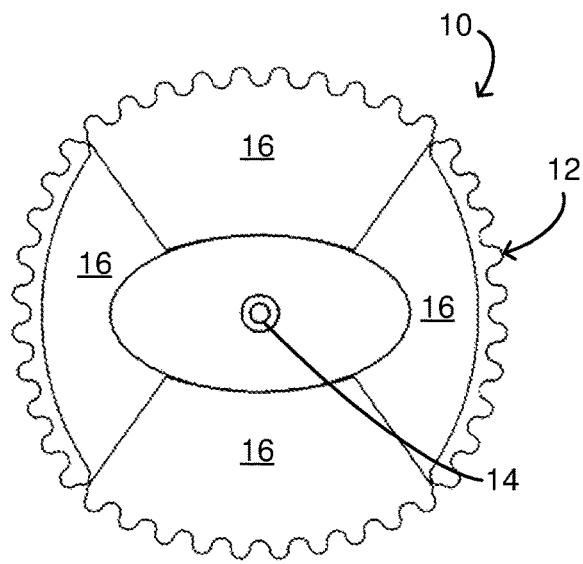
FIG. 1 is a schematic illustration of an exemplary gear according to the present disclosure, in a completely contracted position.

In one embodiment, an energy storage means is added to the transmission system to accumulate energy during motion of the vehicle, whose energy can be exerted back onto the variably expandable gear (FIG. 1). The energy storage means can be a hydraulic system, a gear-based system, a pressurized tank system, a spring system, a chemical energy storage system such as a battery, and by any other means of energy storage.

Figure 2:
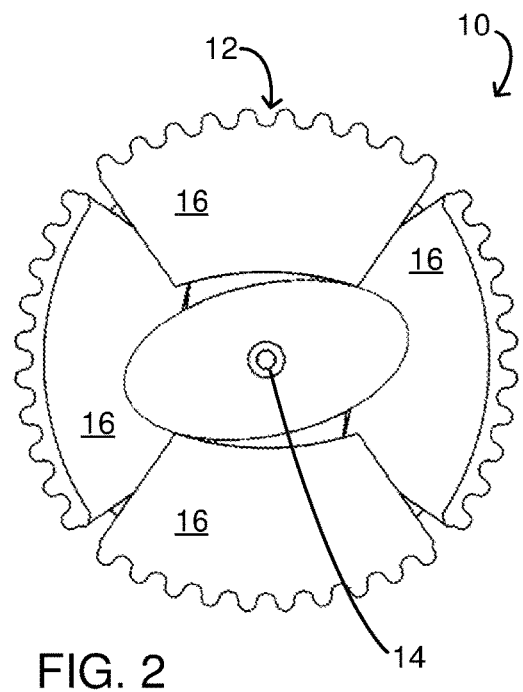
FIG. 2 is a schematic illustration of the gear in FIG. 1 in a slightly expanded position.

In one embodiment, a button, located near the rider, releases the previously stored energy onto the variably expandable gear (FIG. 2) or wheels, to provide a means of propulsion for the rider, using the stored energy. This can be useful during motion through a terrain of excessive upwards slope, presenting a difficult riding experience for the rider. In another embodiment, a computerized or mechanical system can automatically exert this stored energy in times of need, based on road or terrain conditions. In another embodiment, computerized or mechanical system can appropriately exert the stored energy to the variably expandable gear (FIG. 2) or wheels, based on feedback from the pressure sensors.

The text and illustrations of FIGS. 4 through 19 depict and describes components of an exemplary manual embodiment. The exemplary gear system 10 may have a plurality of gear heads 20 radially expandable along linear housing shafts 30. In the exemplary embodiment four gear heads 20 combine to create a complete radius of a primary sprocket 12. Each of the exemplary gear heads 20 may engage a pair of housing shafts 30 with a shaft guide 32. Since there are four gear heads 20 in the exemplary embodiment, there are four pairs of housing shafts 30 radiating outward from the crankshaft 14 perpendicular to the crankshaft 14 and parallel to the plane of the primary sprocket 12.

In the exemplary embodiment, each gear heads 20 has a lock engagement area 22, where a lock mechanism 24 engages the gear head 20 with a lock pad 26. In the exemplary embodiment, lock engagement area 22 is an area of hole patterned cavities, into which complimentary raised interfaces on the lock pads 26 engage to ensure an appropriate lock. The lock mechanism 24 ensures a gear head 20 does not expand during a shift operation while the gear head 20 is engaged with an endless belt 60. Such unwanted expansion may cause binding and friction between the endless belt 60 and the primary sprocket 12.

In the exemplary embodiment, the expansion of the gear heads 20 of the primary sprocket 12 is controlled by a hydraulic inlet 50 from a shifter, positioned conveniently for the operator. In the exemplary embodiment, the hydraulic inlets 50 feed a hydraulic input to both the internal hydraulic mechanism 52 and the external hydraulic mechanism 54. As shown in FIGS. 13 through 19, in the exemplary embodiment, the hydraulic mechanisms (52, 54) cause rotation in the pair of S-shaped shifters 40. Each S-shaped shifter 40 engages a shifter follower 34 along a shifter profile surface 42. The shape of the S-shaped shifters 40, manifested in the curve of the profile surfaces 42, dictates the coordinated movement of the shifter followers 34.

The exemplary shifter followers 34 are affixed to the shaft guides 32. As the shifter followers 34 move against the profile surfaces 42 of the rotating S-shaped shifters 40, the shaft guides 32 similarly are prompted to move. The shaft guides 32 are directly connected to the gear heads 20, so when the shaft guides 32 are prompted to move, which the do along the linear housing shafts 30, the gear heads 20 similarly move. The gear heads 20 will move if they are released from the lock mechanism 24, which occurs when each gear heads 20 is in the rear quadrant position, so as to not bind the endless belt 60. The gear heads 20 not in the rear quadrant position store up tension in housing shaft springs 36, which prompt each gear head 20 to move once it moves into the rear quadrant position.

Figure 8:
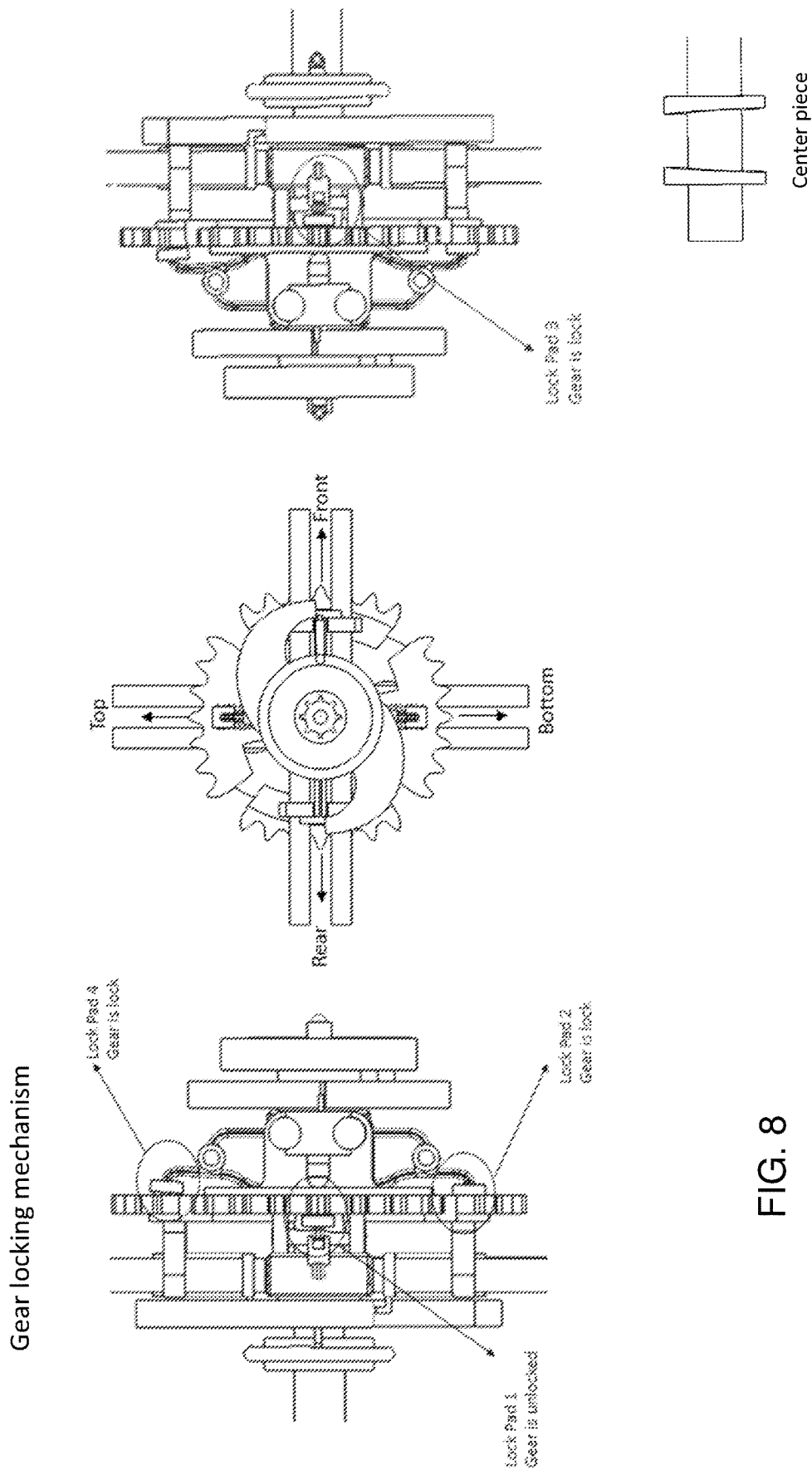
Figure 9:
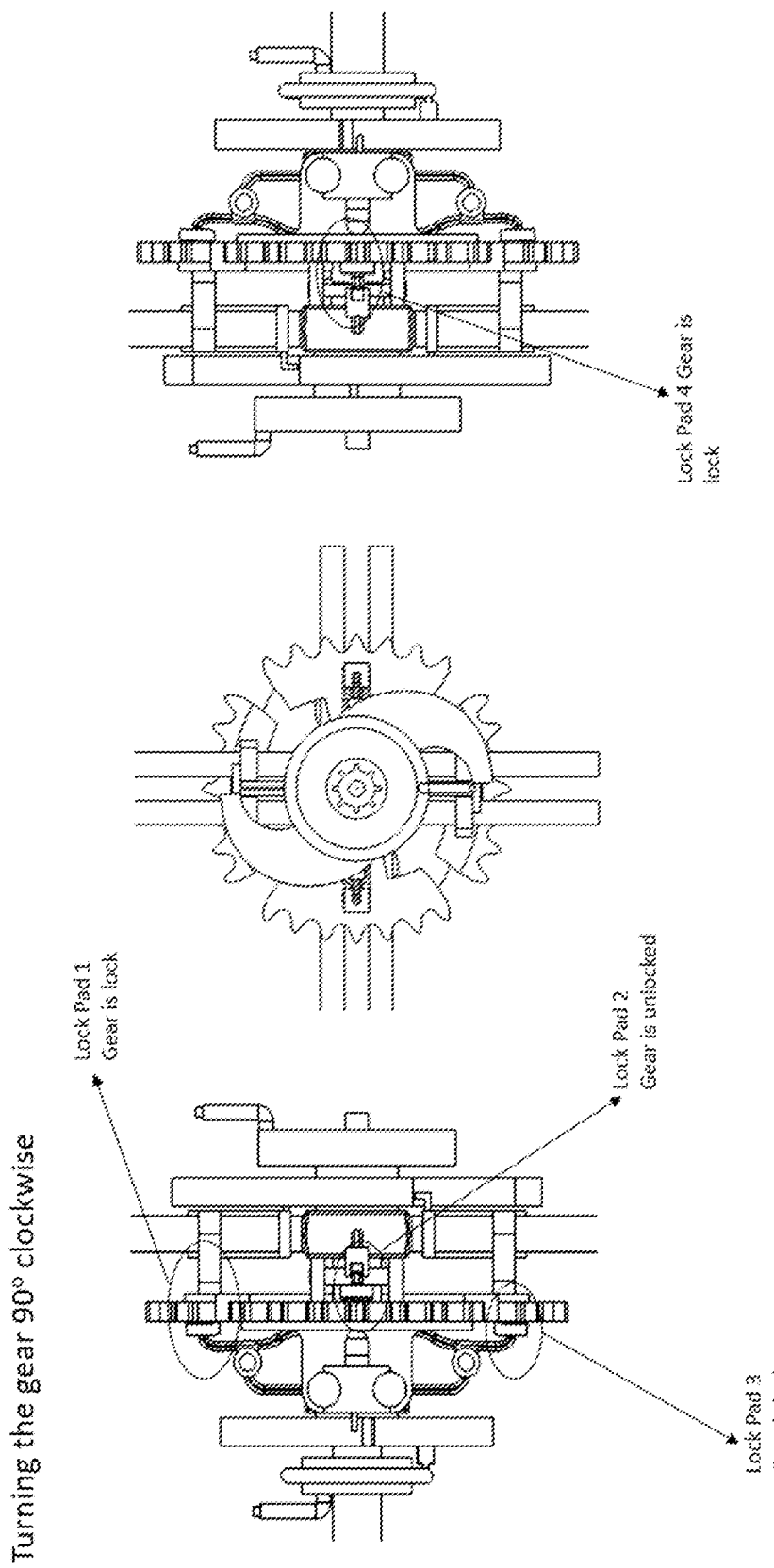
Figure 10:
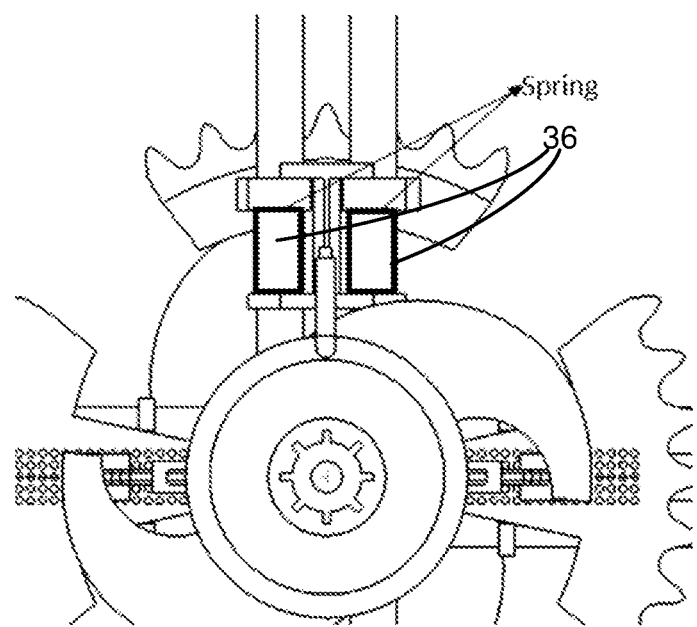
Figure 11:
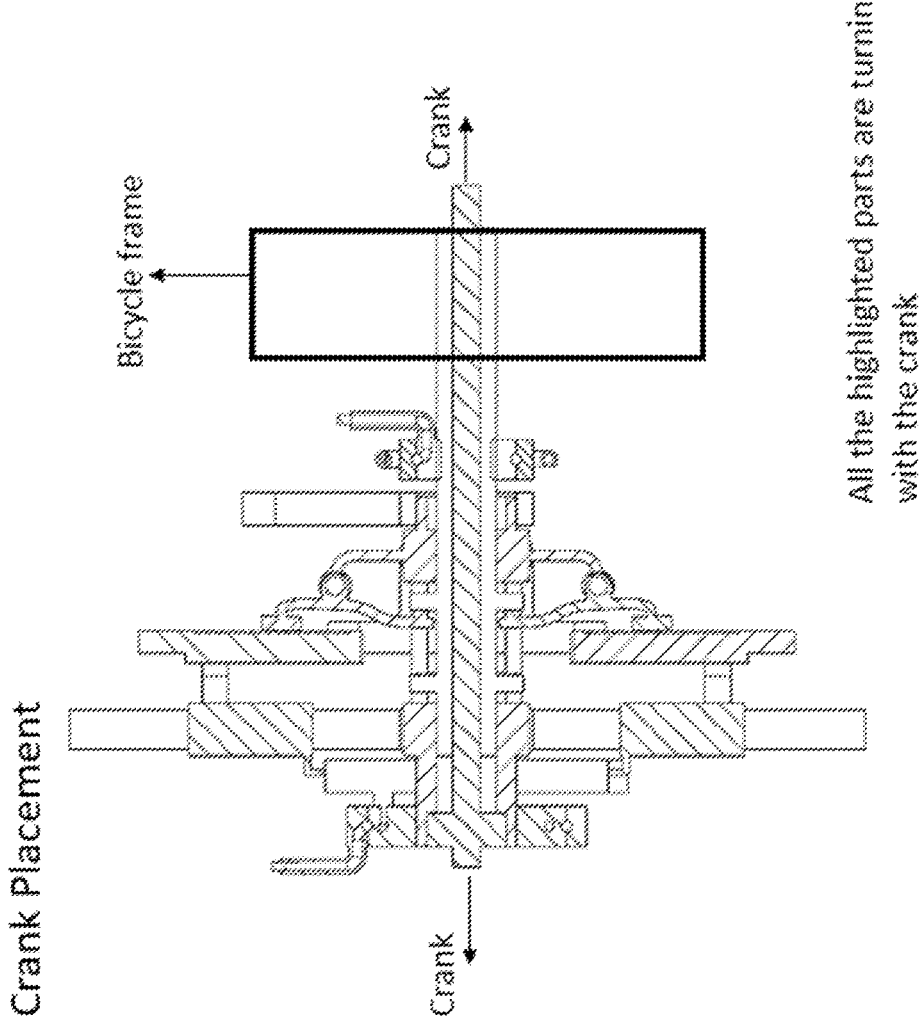
Figure 12:
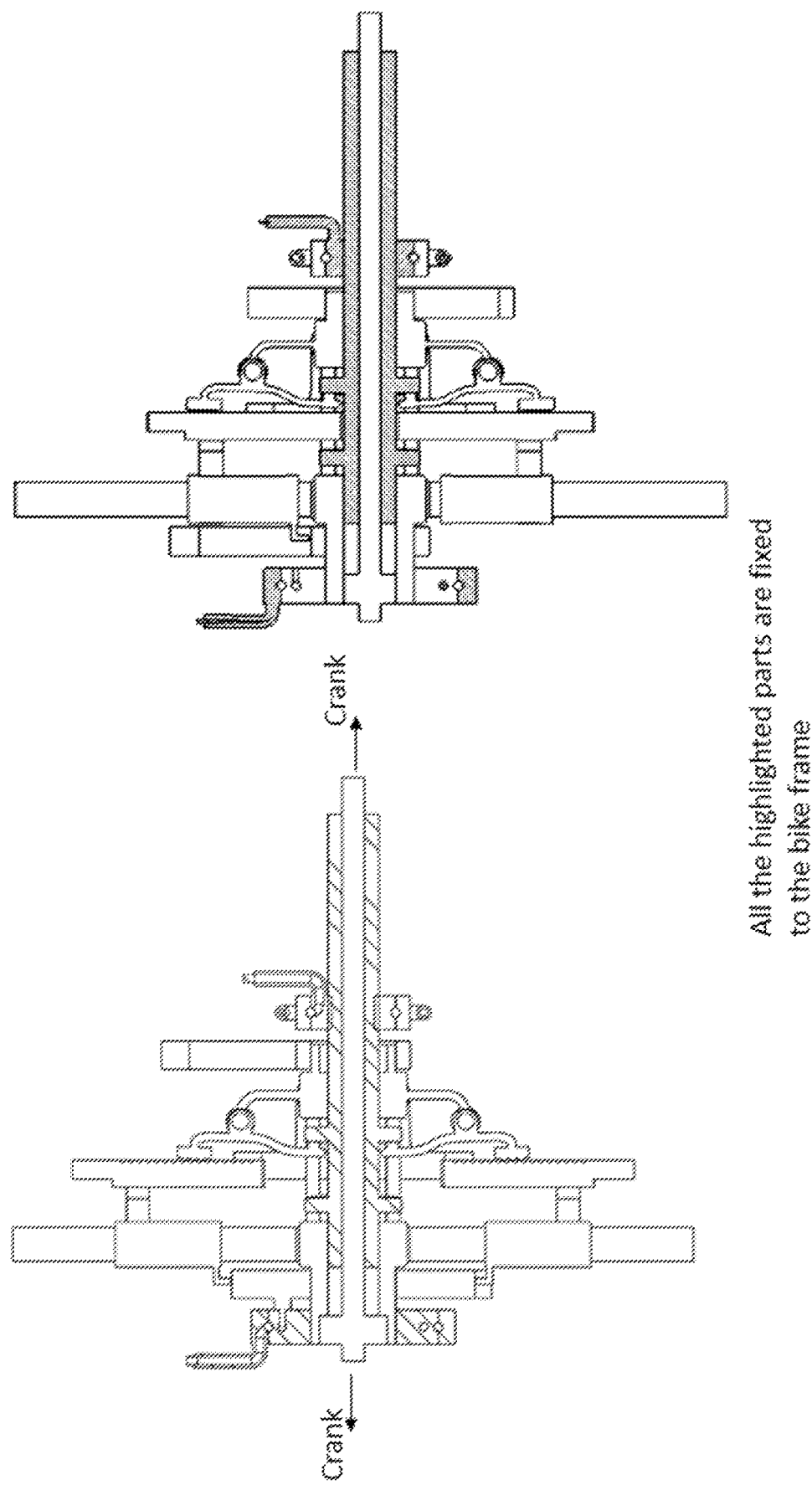
Figure 13:
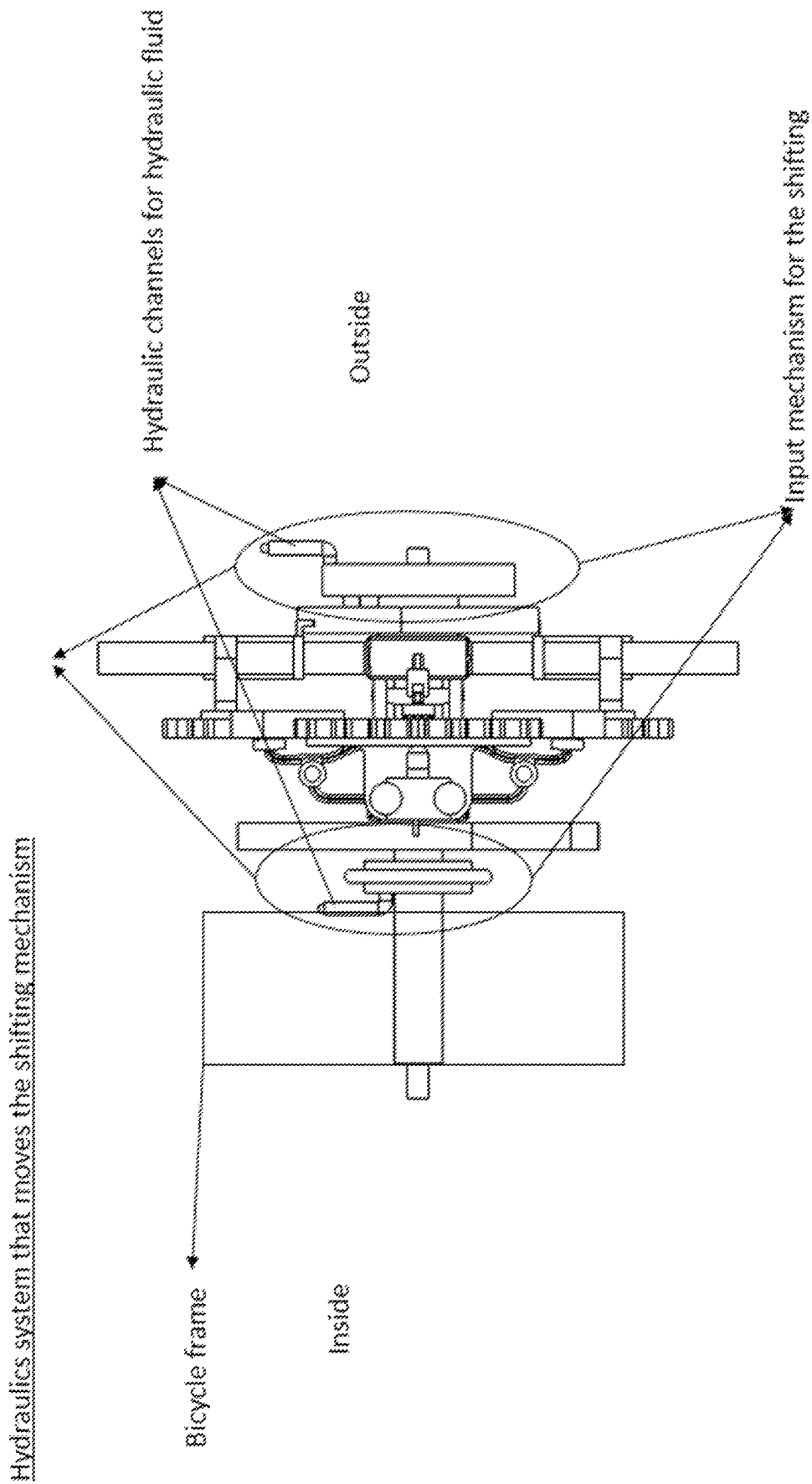
Figure 14:
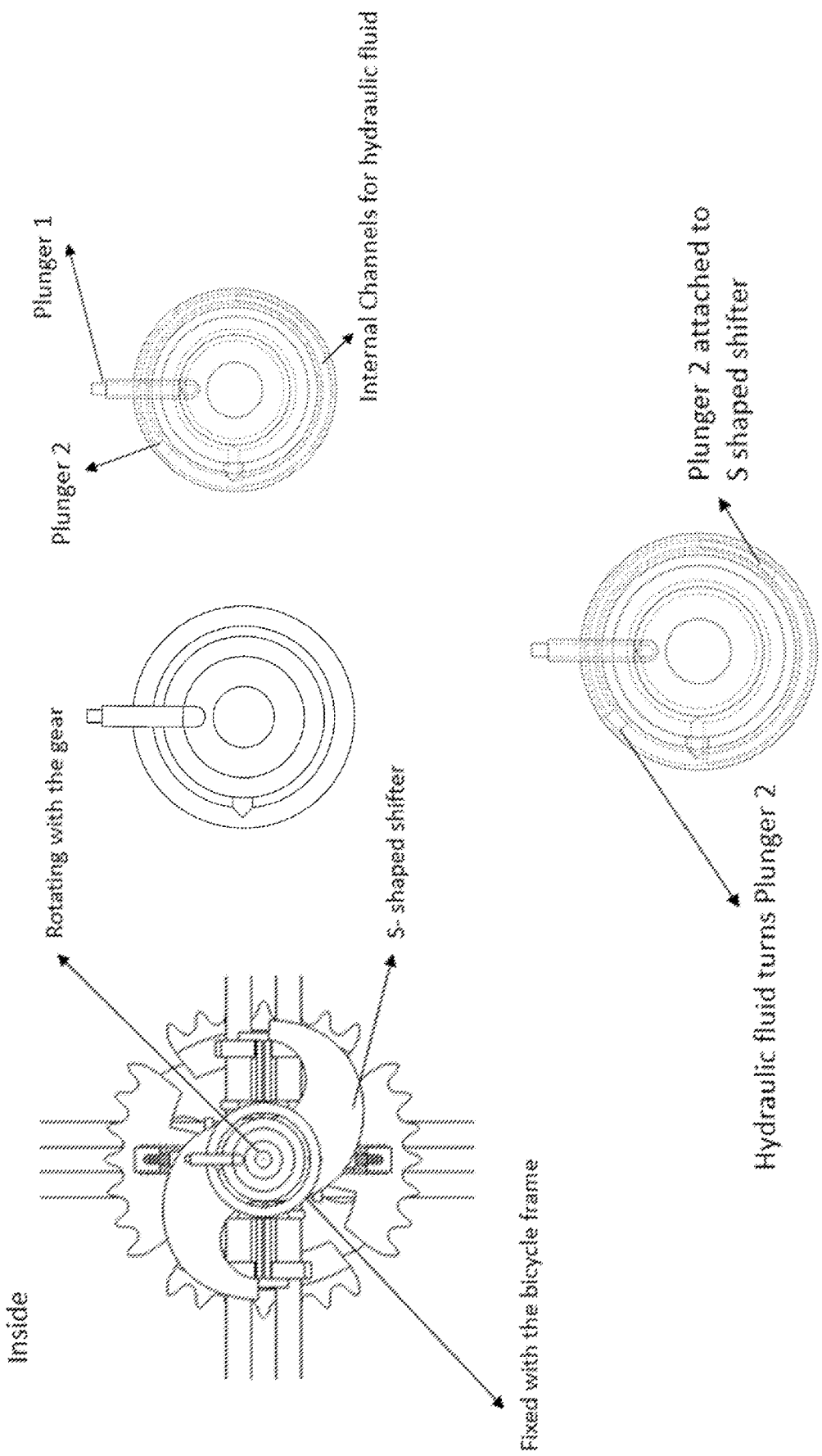
Figure 15:
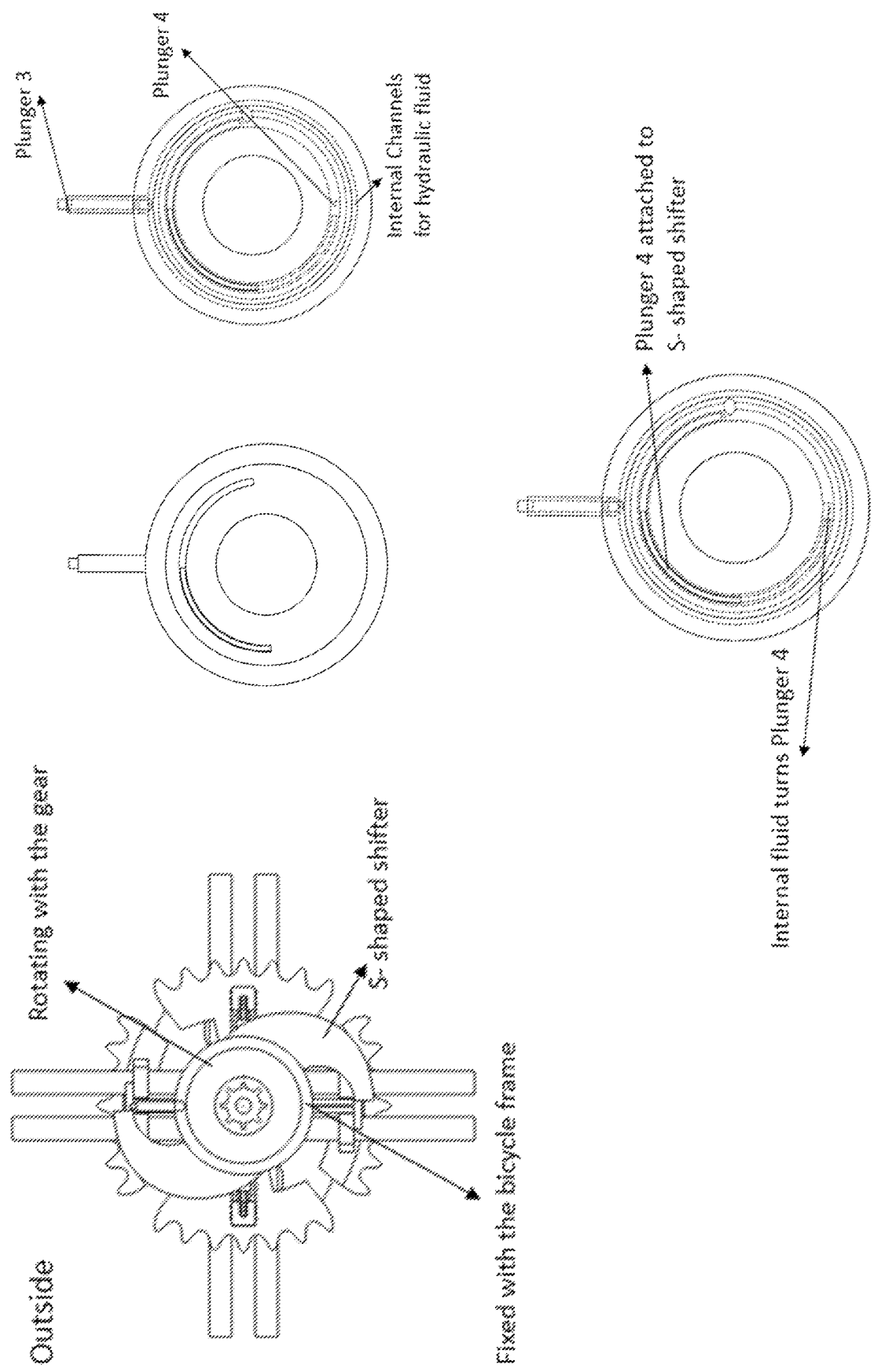
Figure 16:
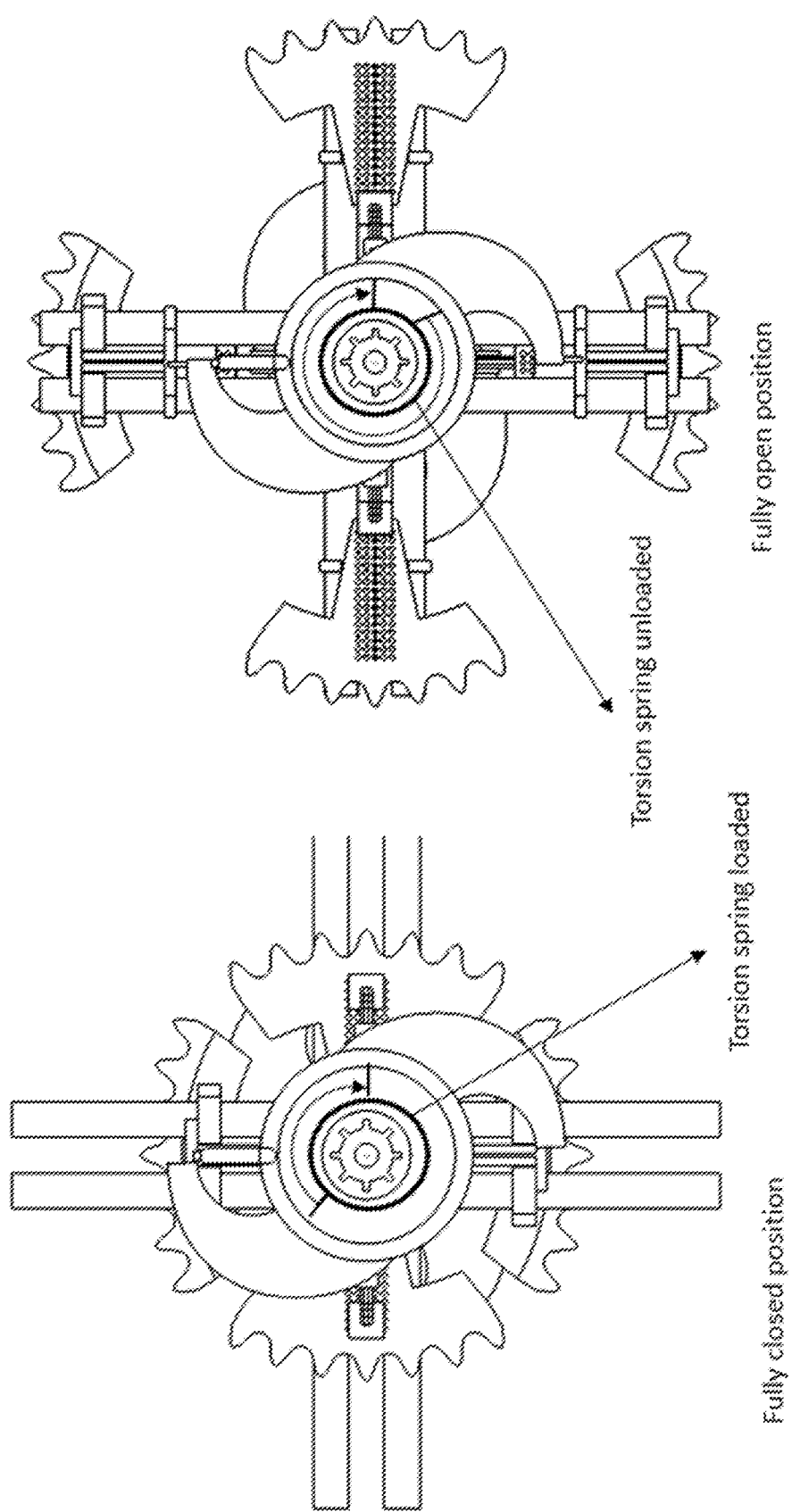
Figure 17:
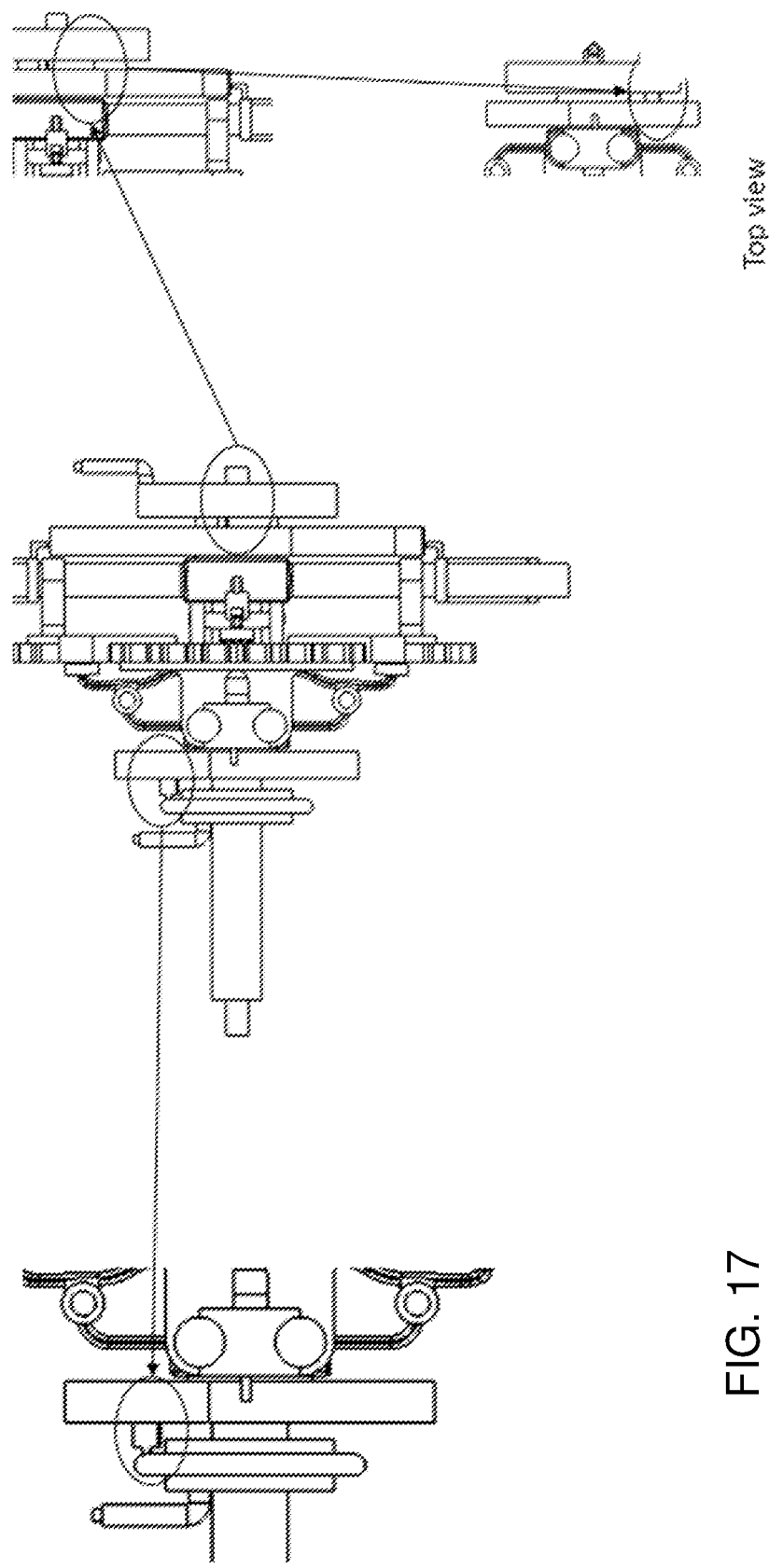
Figure 18:
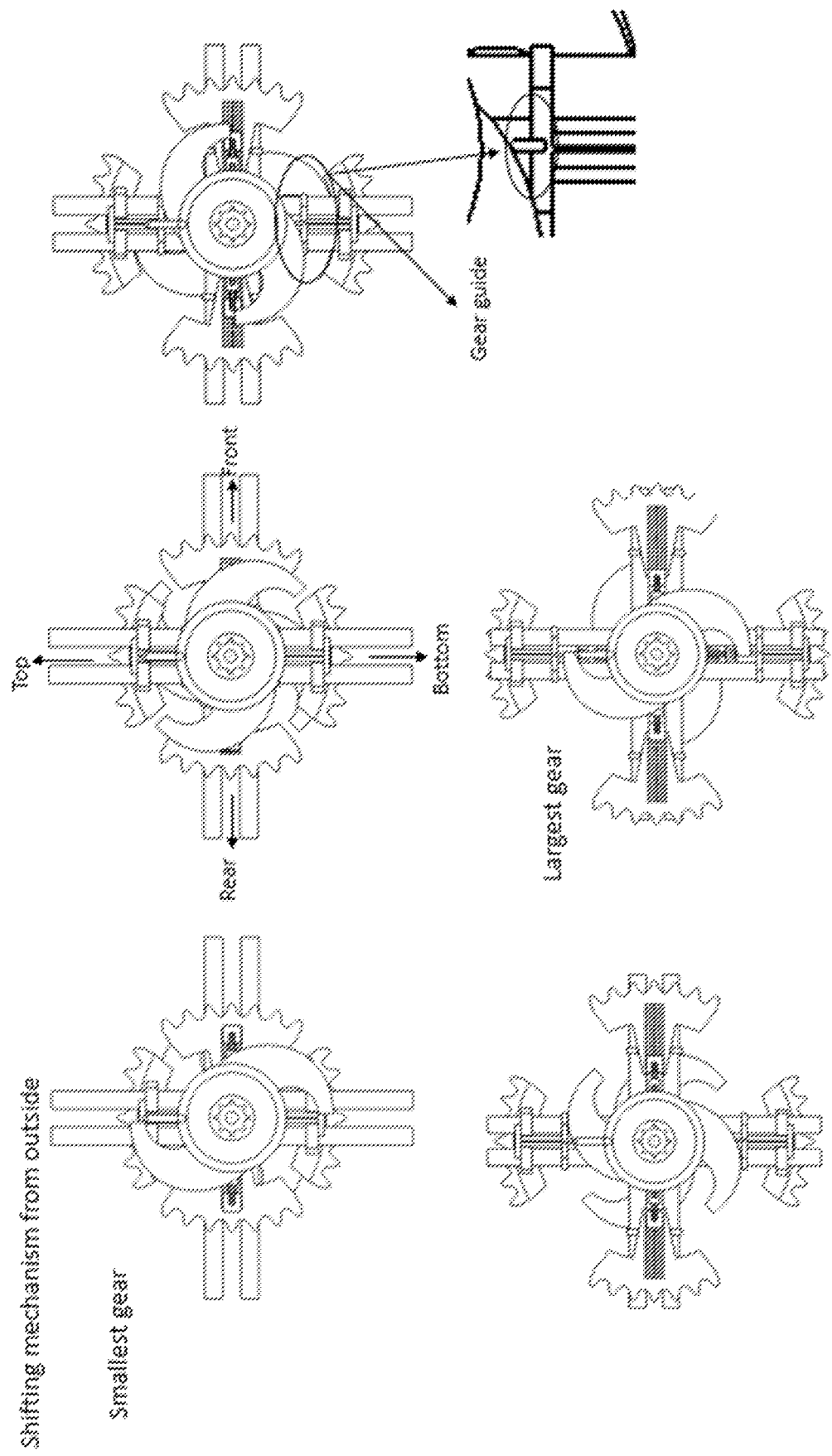
Figure 19:
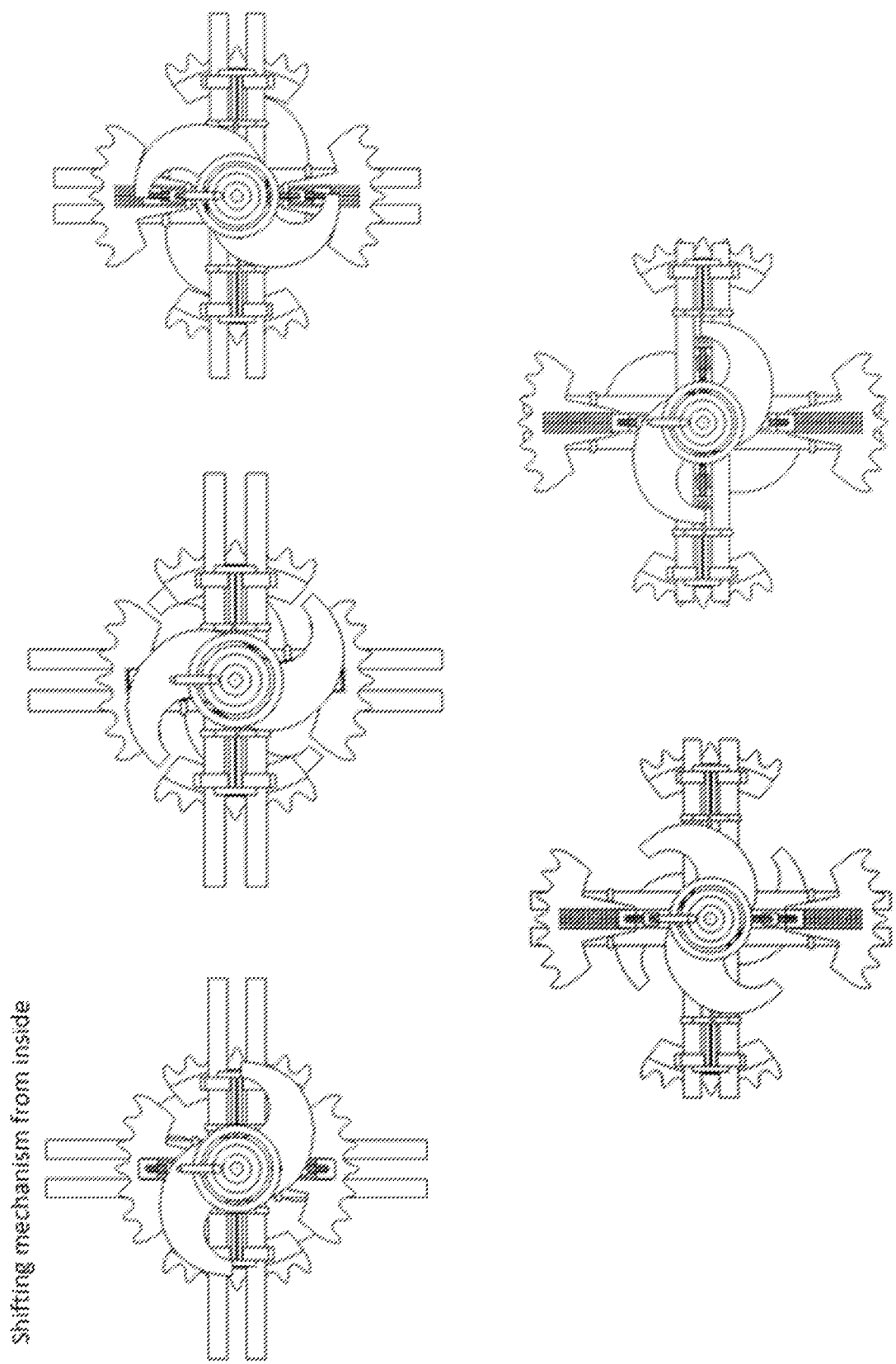
Figure 20:
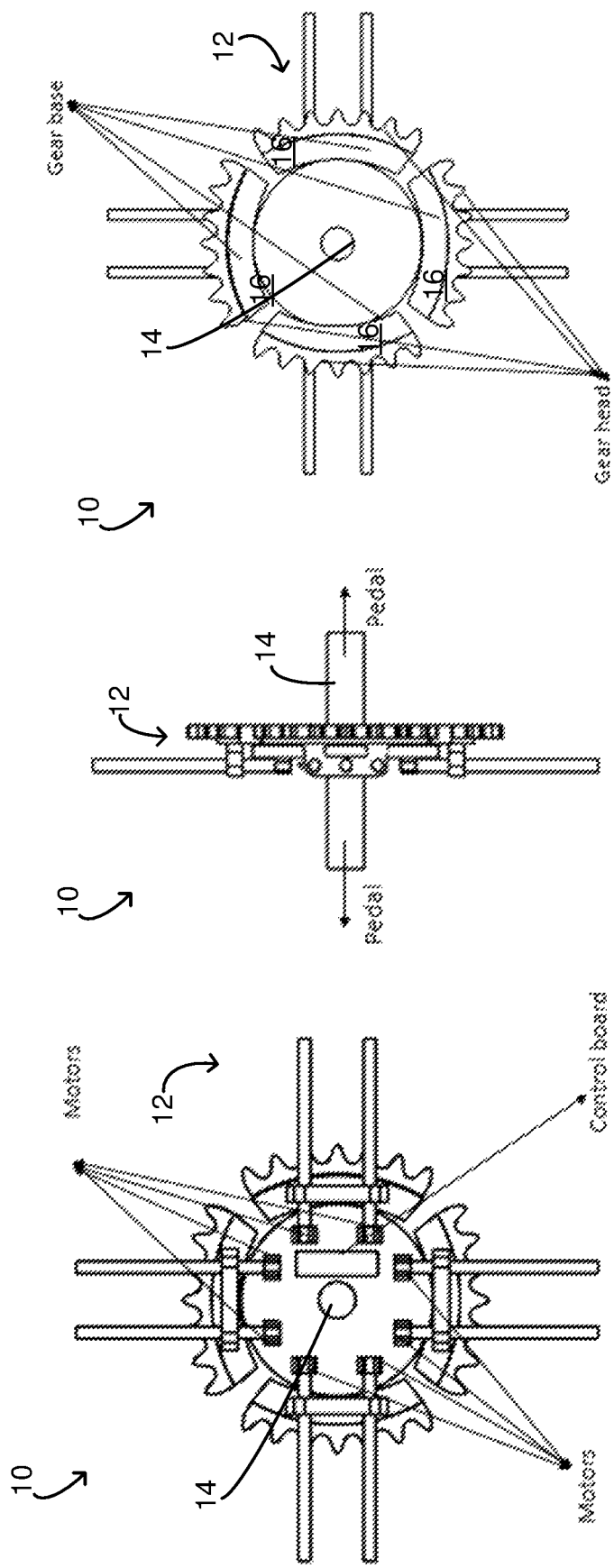
FIGS. 20 through 26 are pages of a presentation of an exemplary electronic alternate exemplary gear, gear set and components according to the present invention.

Other details of the exemplary embodiment are included in the illustrations of FIGS. 4 through 19, and may pertain only to the specific exemplary embodiment. In FIG. 8, the gear head moves up and down on the sprocket housing's shafts. The gear head has hole patterned cavities and the lock pads have the matching holes extruding out, which holds the gear heads in its place. In the quadrant where the chain is not engaged to the gear, the lock pad moves out of the pattern to unlock the gear. The lock pads follow the profile on the center piece, which locks the lock pads when the chain is engaged and unlocks the lock pads when the chain is not engaged. In FIG. 10, there are springs in between each gear head and gear guide. When the S-shaped shifters moved the gear guide up and the gear head is locked with the lock pads, the spring will be compressed. When the gear head reaches the quadrant where it is not engaged with the chain, the lock pad unlocks the gear head and the compressed spring pushes the gear head to expand. In FIG. 13, both the hydraulic channels merges together and extends all the way to the shifters on the bicycle handle. In FIG. 14, plunger 2 turns when the fluid is pushed or pulled in the channel because of the pressure change in the fluid inside the channel. The end of plunger 2 is attached to the S-shaped shifter, which makes the gear expand or contract. In FIG. 15, plunger 4 turns when the fluid is pushed or pulled in the channel because of the pressure change in the fluid inside the channel. The end of plunger 4 attached to the S-shaped shifter, that makes the gear expand or contract. In FIG. 16, torsion spring loads force in the counter-clockwise motion, to apply a returning (clockwise) force to the S-shape shifter. In FIG. 17, the ends of turning type plungers in the hydraulics mechanism are in direct contact with the S-shaped shifters on the respective sides. The connections are shown. The turning motion of the plungers is transferred to the S-shaped shifters, which makes the gear expand or contract. The S-shaped shifter then moves the gear guide up/down based on the direction S-shaped shifters are turning and positioned. There are four gear guides, one for each gear head. These gear guides prevent the gear head from opening more than required. In FIG. 18, the gear guide follows the profile on the S-shaped shifter to make the gears big or small depending on the S-shaped shifter's position.

Figure 21:
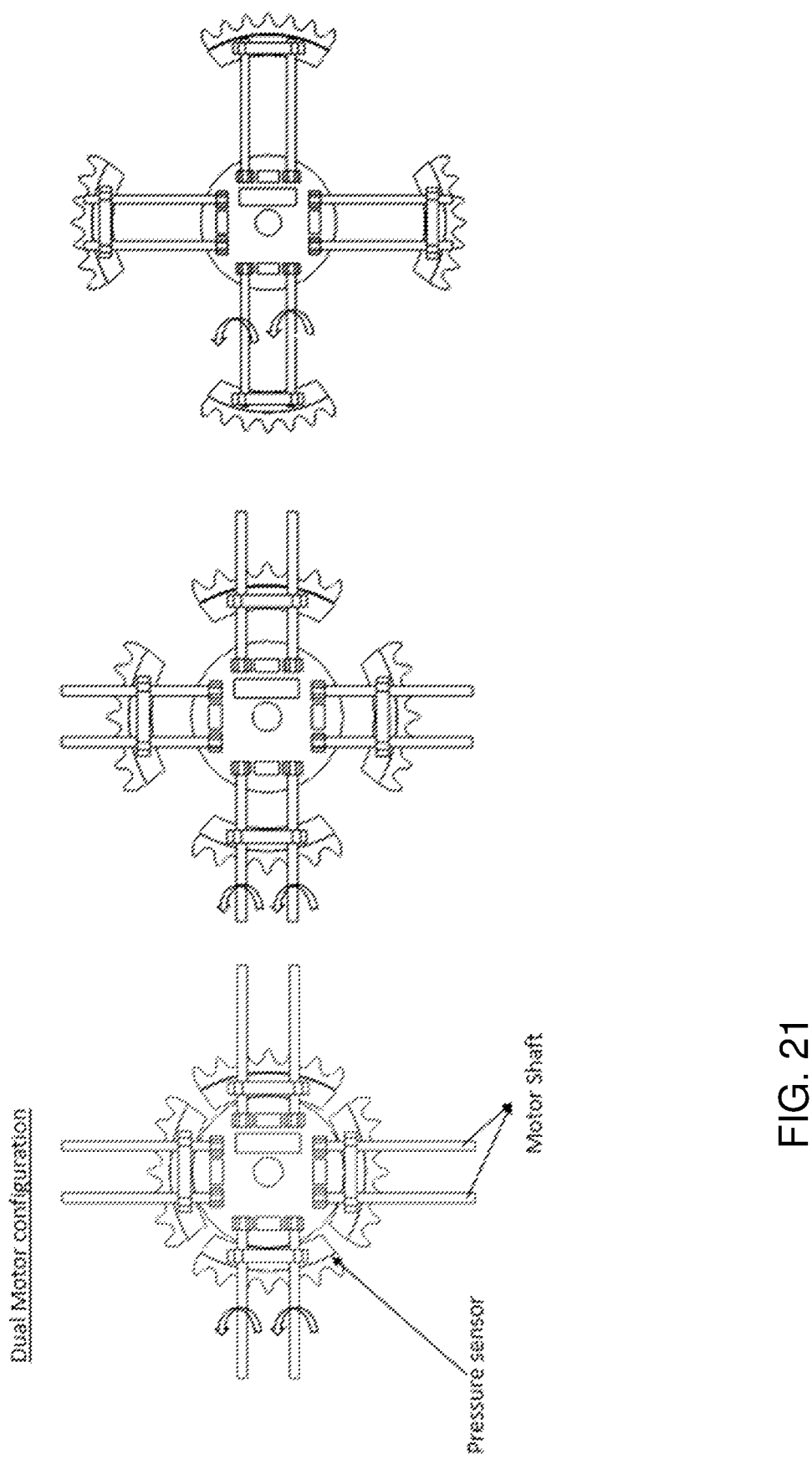
Figure 22:
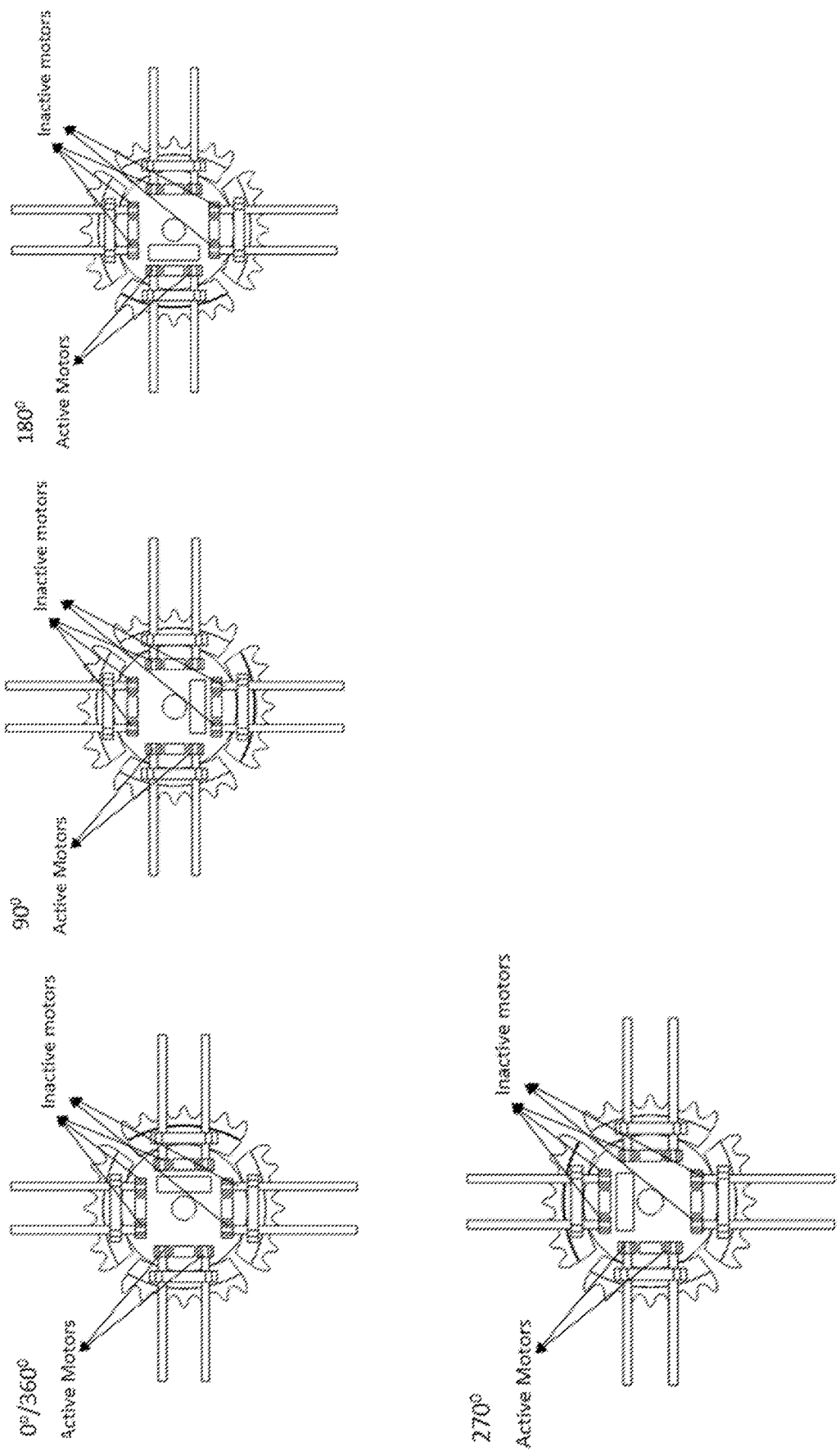
Figure 23:
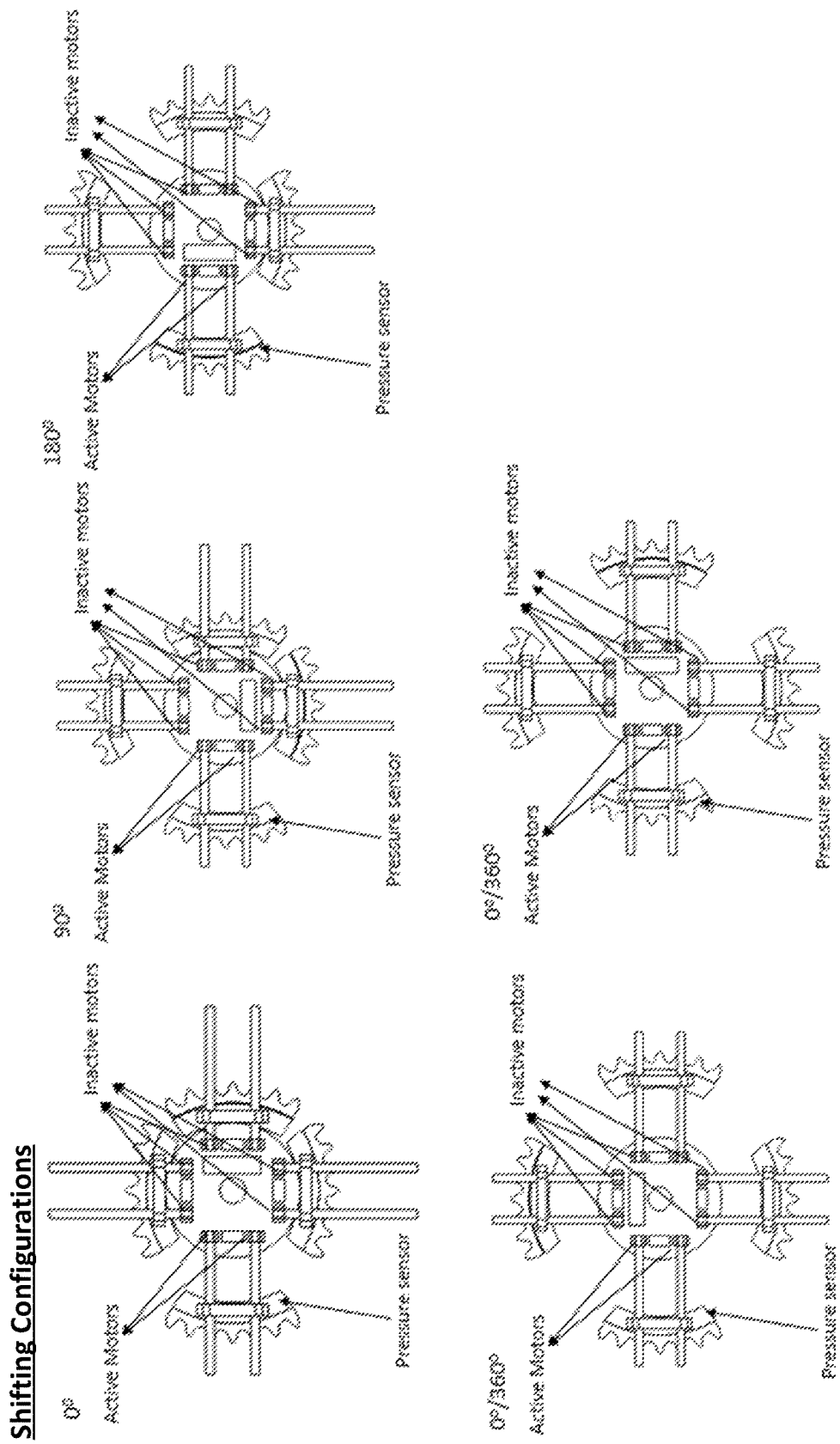
Figure 24:
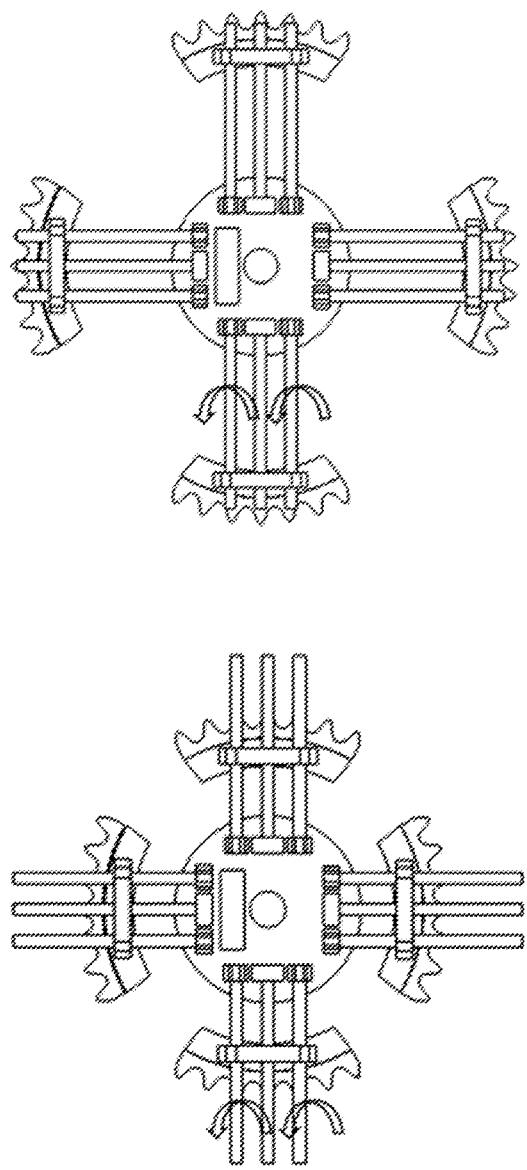
Figure 24:
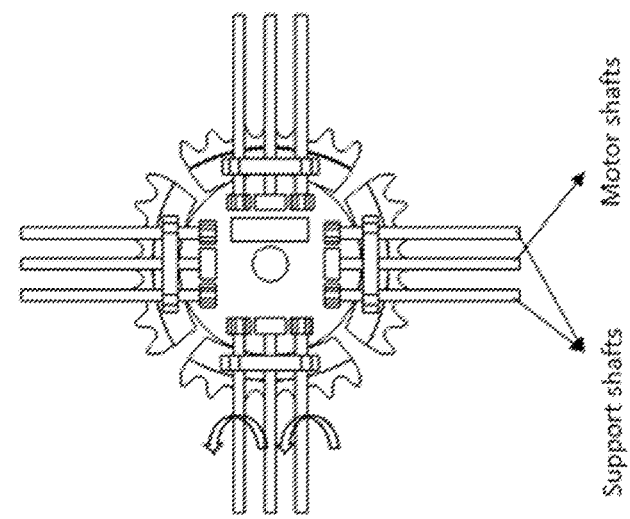
Figure 25:
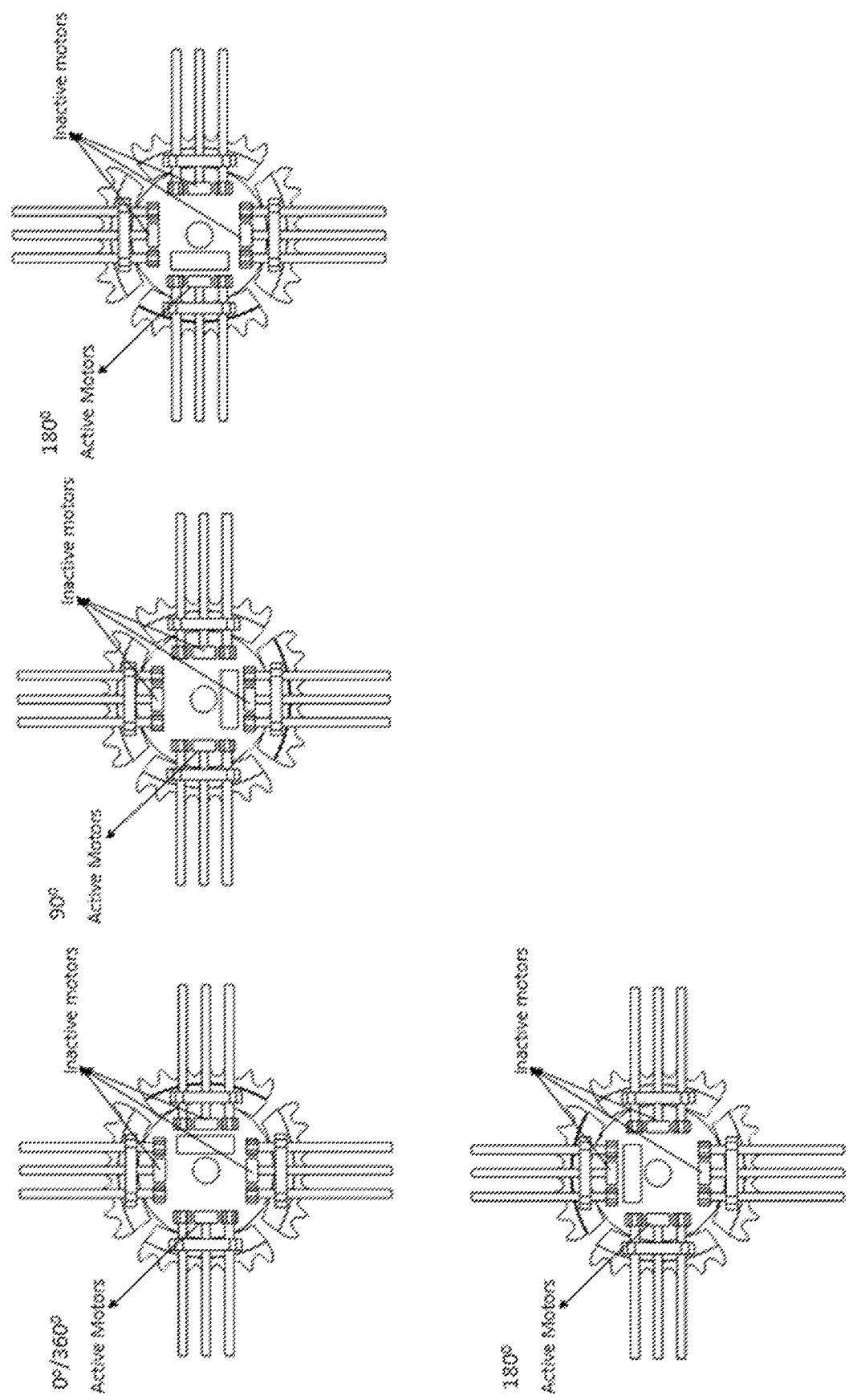
Figure 26:
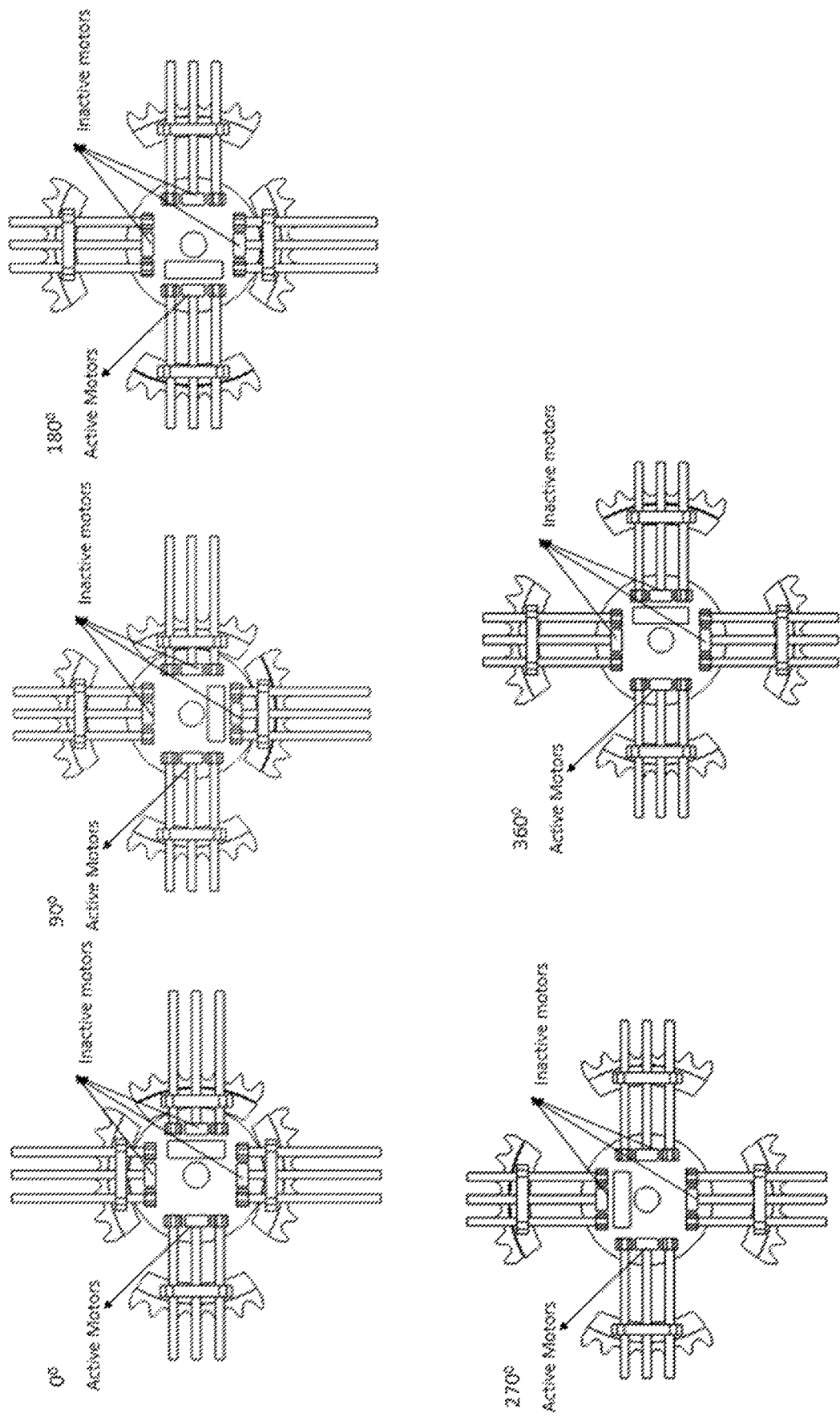

The text and illustrations of FIGS. 20 through 26 depict and describes components of an exemplary electronic embodiment. There can be two motors for each gear section or one motor for each of the gear section. Both the configurations are explained in detail in the FIGS. 20 through 26. In FIG. 21, the motor shafts have external threads and the gear head have the matching internal threads. When the motor shaft turns, it will make the gear expand or contract depending on the direction of shaft rotation. There are pressure sensors between each of the gear head and gear base. The sensor is activated when the gear teeth is engaged with the chain, which will deactivate the motor. As a result, the motor will only move the gear head when the gear teeth is not engaged with the chain. In FIG. 22, there are pressure sensors between the gear head and gear base. The sensor is activated when the gear teeth is engaged with the chain, which will deactivate the motor. As a result, the motor will only move the gear head when the gear teeth is not engaged with the chain.

Figure 27:
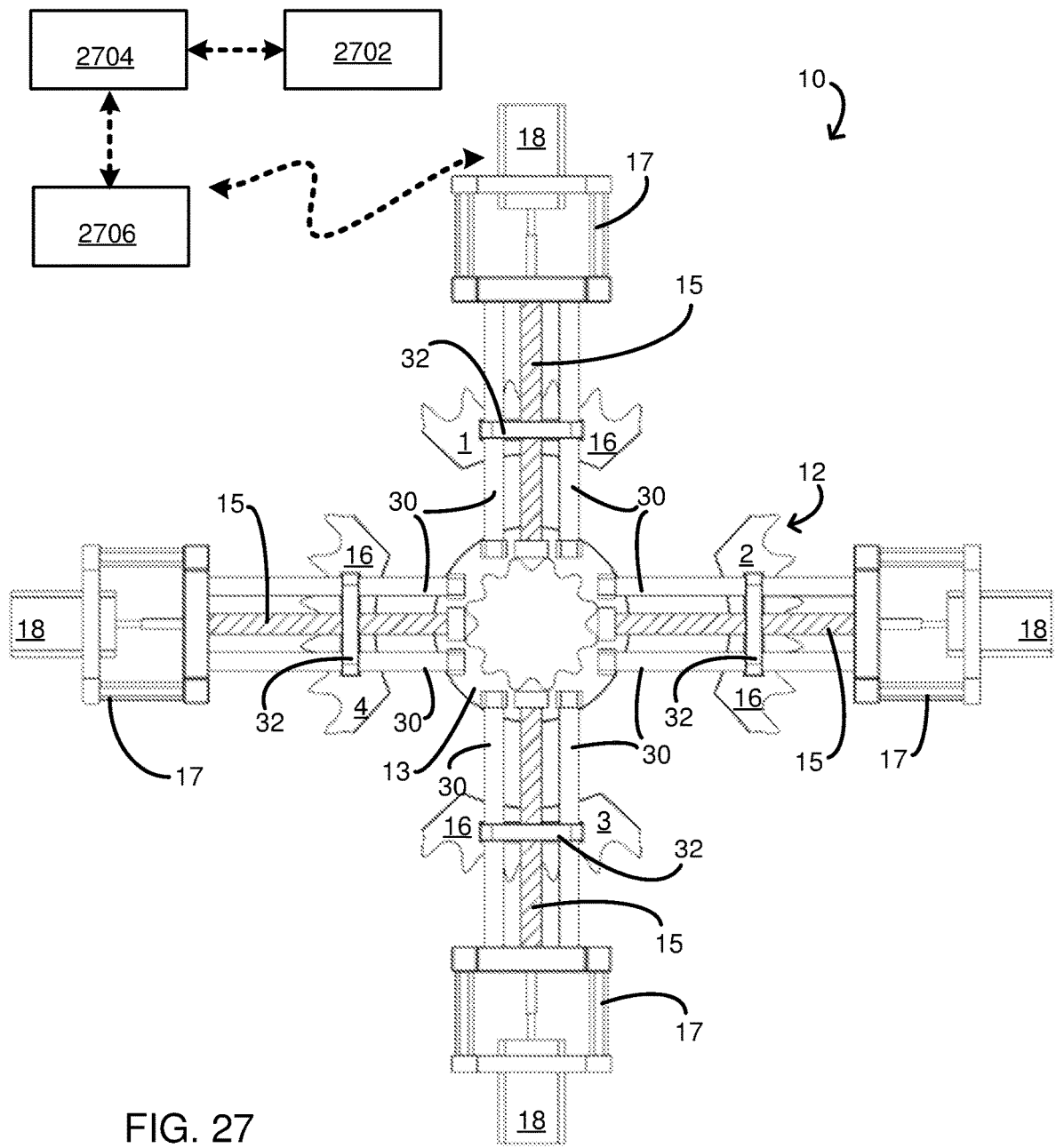
FIG. 27 is an alternate exemplary embodiment of an electronic gear set and components according to the present invention.

FIG. 27 depicts an alternate exemplary embodiment of an electronic gear set 2700. A user may control the gear set 2700 through manual shift actuator or shifter 2702. Manual shifters are known in the field of art. The gear set 2700 may also have a computer 2704 and a control board 2706. Control board 2706 may be functionally linked to a set of motors 18 that effect expansion and contraction of the diameter of the primary sprocket 12.

In the exemplary embodiment, the primary sprocket 12 is comprised of a plurality of sprocket segments 16. The exemplary sprocket segments 16 extend radially from a hub 13, designed to functionally connect to the crankshaft 14, either directly or through a pedal. The multiple sprocket segments 16 are oriented in a single plane to form a unitary sprocket 12 from the multiple sprocket segments 16. The diameter of primary sprocket 12 is determined by the distance a combination of the sprocket segments 16 are positioned from the hub 13. In the exemplary embodiment, movement of the sprocket segments 16 outwardly and inwardly from the hub 13 is accomplished by a lead screw 15 that extends between the hub 13 and a bracket 17.

Each sprocket segment 16 is mounted to a housing shaft 30 and a lead screw 15 through a lead screw nut 32. The exemplary lead screw nut 32 also acts as a guide along the housing shaft 30. Rotational movement of lead screw 15 results in sprocket segment 16 moving outwardly or inwardly, depending on the rotational direction of the lead screw 15.

In the exemplary embodiment, the bracket 17 holds a motor 18 at the opposite ends of the housing shaft 30 and lead screw 15 from the hub 13. One end of the lead screw 15 is attached to the hub 13 while the other end of the lead screw 15 is attached to the motor 18. Motor 18 is secured to the end of the lead screw 15 and housing shaft 30 by bracket 17.

In the exemplary embodiment, the primary sprocket 12 is comprised of four sprocket segments 16. Each sprocket segment 16 is mounted to an independent lead screw 15 and motor 18. The computer 2704 and control board 2706 coordinate and control the operation of the motors 18 so as to appropriately expand and contract the diameter of primary sprocket 12. As in the prior embodiment, a particular sprocket segment 16 is moved outwardly when it is in the rear quadrant, and not in contact with the drive chain.

The particular shifter can communicate to either or both a computer 2704 and a control board 2706. The gear set 2700 may be adapted with a computer 2704 capable of running computerized programs or applications. The computer 2704 may be an independent processor integrated into the gear body or placed somewhere else on the vehicle. The computer 2704 may also be a rider's personal computer, such as a smartphone. A control board 2706 in functional communication with the gear set 10 may function as the conduit for instructions and data between the gear set 10 and the computer 2704.

When the rider desires to manually change the gear, the rider may press the shifter 2702 located conveniently to the rider. The computer 2704 and control board 2706 may enable a wireless shifter 2702.

Computerized programs may include a wide variety of controls and adaptations, so as to make the gear set 2700 perform as the rider desires, or to obtain additional information regarding the rider's riding performance. The shifters 2702 may be connected to the control board 2706 wirelessly. The gear shifting signal from the shifters 2702 may be used to run the motors 18 clockwise or counter-clockwise depending on the bikers needs of expanding or contracting the gear.

The control board 2706 may have the following sensors, which may assist bikers with feedback in various riding conditions: gyroscope, accelerometer, altimeter, GPS, Bluetooth, Wi-Fi, pressure sensor, watt meter, light sensor, rain sensor, proximity sensor, micro-controller, and memory, self-charging battery/miniature generator. Few examples where the biker may get assistance may include:
  a. The gear may be set to a specific value of force applied by the biker or the RPM value as per the biker's comfort.
  b. The gear will monitor the riding conditions/riding style of the biker and send feedback to the biker's device to help the biker keep constant track of the riding condition, and help the biker to make required adjustments for improvement.

The examples contained in this specification are merely possible implementations of the current system, and alternatives to the particular features, elements and process steps, including scope and sequence of the steps may be changed without departing from the spirit of the invention. The present invention should only be limited by the examined and allowed claims, and their legal equivalents, since the provided exemplary embodiments are only examples of how the invention may be employed, and are not exhaustive.

We claim:

1. A system, comprising:
   a gear comprising a plurality of movable portions that are individually or collectively movable to adjust a dimension or a shape of the gear;
   a shifter operatively coupled to the gear, wherein the shifter is configured to selectively adjust the dimension or the shape of the gear to control one or more operational parameters or riding conditions associated with the gear or a vehicle utilizing the gear;
   one or more sensors configured to detect position information for at least one movable portion of the plurality of movable portions of the gear, wherein the position information indicates a position of the at least one movable portion relative to a drive unit of the vehicle;
   a mechanism configured to control a movement of the at least one movable portion based on the position information detected for the at least one movable portion;
   one or more motors configured to selectively move the plurality of movable portions to adjust the dimension or the shape of the gear; and
   a control board operatively coupled to the one or more motors to provide one or more signals independently to each of the one or more motors to rotate clockwise, rotate counterclockwise, or not rotate.

2. The system of claim 1, wherein the control board is operatively coupled to a mobile device of an individual operating the vehicle via a wired or wireless network.

3. A system, comprising:
   a gear comprising a plurality of movable portions that are individually or collectively movable to adjust a dimension or a shape of the gear;
   a shifter operatively coupled to the gear, wherein the shifter is configured to selectively adjust the dimension or the shape of the gear to control one or more operational parameters or riding conditions associated with the gear or a vehicle utilizing the gear;
   one or more sensors configured to detect position information for at least one movable portion of the plurality of movable portions of the gear, wherein the position information indicates a position of the at least one movable portion relative to a drive unit of the vehicle;
   a mechanism configured to control a movement of the at least one movable portion based on the position information detected for the at least one movable portion;
   a hub securable to a shaft of the vehicle to rotate with the shaft as the shaft rotates around a rotational axis;
   a plurality of lead screws attached at one end to the hub for operational rotation of each lead screw, wherein the plurality of lead screws extend radially from the hub in a plane perpendicular to the rotational axis of the shaft; and a motor functionally attached to the other end of the lead screws to impart rotation onto the lead screws in both a clockwise and counterclockwise direction, wherein the plurality of movable portions of the gear are configured to move either outwardly or inwardly in response to a clockwise or counterclockwise rotation of a corresponding lead screw, wherein each of the plurality of movable portions is oriented in a plane perpendicular to the rotational axis of the shaft so as to collectively form a segmented sprocket.

* * * * *